(12) United States Patent
Nichols et al.

(10) Patent No.: US 11,790,164 B2
(45) Date of Patent: *Oct. 17, 2023

(54) CONFIGURABLE AND PORTABLE SYSTEM FOR GENERATING NARRATIVES

(71) Applicant: Narrative Science Inc., Chicago, IL (US)

(72) Inventors: Nathan Drew Nichols, Chicago, IL (US); Lawrence A. Birnbaum, Evanston, IL (US); Kristian J. Hammond, Chicago, IL (US)

(73) Assignee: Narrative Science Inc., Chicago, IL (US)

(*) Notice: Subject to any disclaimer, the term of this patent is extended or adjusted under 35 U.S.C. 154(b) by 36 days.

This patent is subject to a terminal disclaimer.

(21) Appl. No.: 16/876,556

(22) Filed: May 18, 2020

(65) Prior Publication Data

US 2020/0279072 A1 Sep. 3, 2020

Related U.S. Application Data

(63) Continuation of application No. 13/464,675, filed on May 4, 2012, now Pat. No. 10,657,201, which is a
(Continued)

(51) Int. Cl.
*G06F 40/20* (2020.01)
*G06F 40/00* (2020.01)
(Continued)

(52) U.S. Cl.
CPC ............. *G06F 40/20* (2020.01); *G06F 40/00* (2020.01)

(58) Field of Classification Search
None
See application file for complete search history.

(56) References Cited

U.S. PATENT DOCUMENTS

| 4,992,939 A | 2/1991 | Tyler |
| 5,734,916 A | 3/1998 | Greenfield et al. |

(Continued)

FOREIGN PATENT DOCUMENTS

| WO | 9630844 A1 | 10/1996 |
| WO | 2006122329 A2 | 11/2006 |

OTHER PUBLICATIONS

Nathan Weston; "A Framework for Constructing Semantically Composable Feature Models from Natural Language Requirements"; SPLC '09: Proceedings of the 13th International Software Product Line Conference;2009;pp. 211-220 (Year: 2009).*

(Continued)

*Primary Examiner* — Albert M Phillips, III
*Assistant Examiner* — Jermaine A Mincey
(74) *Attorney, Agent, or Firm* — Thompson Coburn LLP

(57) ABSTRACT

The subject invention functions to use available data and information to automatically create narrative stories that describes domain events, circumstances and/or entities in a comprehensible and compelling and audience customized, manner. Computer executable instructions provide for generating a narrative story using standard and uniform structures and data for receiving domain related data and a story specification, parsing the story specification to provide constituent components, transforming the constituent components into executable code, instantiating content blocks having at least one feature for the domain according to the story specification and rendering the narrative story using the constituent components specified by the content blocks.

30 Claims, 10 Drawing Sheets

Related U.S. Application Data continuation of application No. 12/986,996, filed on Jan. 7, 2011, now abandoned.

(51) Int. Cl.
  *G06F 40/205* (2020.01)
  *G06F 40/35* (2020.01)

(56) References Cited

U.S. PATENT DOCUMENTS

| | | | |
|---|---|---|---|
| 5,802,495 A | 9/1998 | Goltra | |
| 6,289,363 B1 | 9/2001 | Consolatti et al. | |
| 6,651,218 B1 | 11/2003 | Adler et al. | |
| 6,665,666 B1 | 12/2003 | Brown et al. | |
| 6,917,936 B2 | 7/2005 | Cancedda | |
| 6,968,316 B1 | 11/2005 | Hamilton | |
| 6,976,031 B1 | 12/2005 | Toupal et al. | |
| 7,246,315 B1 * | 7/2007 | Andrieu | G06Q 90/00 715/706 |
| 7,324,936 B2 | 1/2008 | Saldanha et al. | |
| 7,333,967 B1 | 2/2008 | Bringsjord et al. | |
| 7,496,621 B2 | 2/2009 | Pan et al. | |
| 7,577,634 B2 | 8/2009 | Ryan et al. | |
| 7,610,279 B2 | 10/2009 | Budzik et al. | |
| 7,617,199 B2 | 11/2009 | Budzik et al. | |
| 7,617,200 B2 | 11/2009 | Budzik et al. | |
| 7,627,565 B2 | 12/2009 | Budzik et al. | |
| 7,644,072 B2 | 1/2010 | Budzik et al. | |
| 7,657,518 B2 | 2/2010 | Budzik et al. | |
| 7,716,116 B2 | 5/2010 | Schiller | |
| 7,756,810 B2 | 7/2010 | Nelken et al. | |
| 7,778,895 B1 | 8/2010 | Baxter et al. | |
| 7,818,329 B2 * | 10/2010 | Campbell | G06F 16/4393 707/755 |
| 7,836,010 B2 | 11/2010 | Hammond et al. | |
| 7,840,448 B2 | 11/2010 | Musgrove et al. | |
| 7,856,390 B2 | 12/2010 | Schiller | |
| 7,865,496 B1 | 1/2011 | Schiller | |
| 7,930,169 B2 | 4/2011 | Billerey-Mosier | |
| 8,046,226 B2 | 10/2011 | Soble et al. | |
| 8,355,903 B1 | 1/2013 | Birnbaum et al. | |
| 8,374,848 B1 | 2/2013 | Birnbaum et al. | |
| 8,447,604 B1 | 5/2013 | Chang | |
| 8,463,695 B2 | 6/2013 | Schiller | |
| 8,494,944 B2 | 7/2013 | Schiller | |
| 8,495,002 B2 | 7/2013 | Nelken et al. | |
| 8,515,737 B2 | 8/2013 | Allen | |
| 8,630,844 B1 | 1/2014 | Nichols et al. | |
| 8,630,912 B2 | 1/2014 | Seki et al. | |
| 8,630,919 B2 | 1/2014 | Baran et al. | |
| 8,645,124 B2 | 2/2014 | Karov Zangvil | |
| 8,676,691 B2 | 3/2014 | Schiller | |
| 8,688,434 B1 | 4/2014 | Birnbaum et al. | |
| 8,762,285 B2 | 6/2014 | Davis et al. | |
| 8,775,161 B1 | 7/2014 | Nichols et al. | |
| 8,812,311 B2 | 8/2014 | Weber | |
| 8,819,001 B1 | 8/2014 | Zhang | |
| 8,843,363 B2 | 9/2014 | Birnbaum et al. | |
| 8,886,520 B1 | 11/2014 | Nichols et al. | |
| 8,892,417 B1 | 11/2014 | Nichols et al. | |
| 9,047,283 B1 | 6/2015 | Zhang et al. | |
| 9,164,982 B1 | 10/2015 | Kaeser | |
| 9,251,134 B2 | 2/2016 | Birnbaum et al. | |
| 9,396,758 B2 | 7/2016 | Oz et al. | |
| 9,697,178 B1 | 7/2017 | Nichols et al. | |
| 9,720,884 B2 | 8/2017 | Birnbaum et al. | |
| 10,185,477 B1 | 1/2019 | Paley et al. | |
| 10,482,381 B2 | 11/2019 | Nichols et al. | |
| 10,489,488 B2 | 11/2019 | Birnbaum et al. | |
| 10,657,201 B1 | 5/2020 | Nichols et al. | |
| 10,699,079 B1 | 6/2020 | Paley et al. | |
| 10,706,236 B1 | 7/2020 | Platt et al. | |
| 10,747,823 B1 | 8/2020 | Birnbaum et al. | |
| 10,755,042 B2 | 8/2020 | Birnbaum et al. | |
| 10,755,046 B1 | 8/2020 | Lewis Meza et al. | |
| 10,762,304 B1 | 9/2020 | Paley et al. | |
| 10,853,583 B1 | 12/2020 | Platt et al. | |
| 10,943,069 B1 | 3/2021 | Paley et al. | |
| 10,956,656 B2 | 3/2021 | Birnbaum et al. | |
| 10,963,649 B1 | 3/2021 | Sippel et al. | |
| 10,990,767 B1 | 4/2021 | Smathers et al. | |
| 11,003,866 B1 | 5/2021 | Sippel et al. | |
| 11,023,689 B1 | 6/2021 | Sippel et al. | |
| 11,030,408 B1 | 6/2021 | Meza et al. | |
| 11,042,708 B1 | 6/2021 | Pham et al. | |
| 11,042,709 B1 | 6/2021 | Pham et al. | |
| 11,042,713 B1 | 6/2021 | Platt et al. | |
| 11,068,661 B1 | 7/2021 | Nichols et al. | |
| 11,126,798 B1 | 9/2021 | Lewis Meza et al. | |
| 11,144,838 B1 | 10/2021 | Platt et al. | |
| 11,170,038 B1 | 11/2021 | Platt et al. | |
| 11,182,556 B1 | 11/2021 | Lewis Meza et al. | |
| 11,188,588 B1 | 11/2021 | Platt et al. | |
| 11,222,184 B1 | 1/2022 | Platt et al. | |
| 11,232,268 B1 | 1/2022 | Platt et al. | |
| 11,232,270 B1 | 1/2022 | Platt et al. | |
| 11,238,090 B1 | 2/2022 | Platt et al. | |
| 11,288,328 B2 | 3/2022 | Birnbaum et al. | |
| 11,334,726 B1 | 5/2022 | Platt et al. | |
| 11,341,330 B1 | 5/2022 | Smathers et al. | |
| 11,341,338 B1 | 5/2022 | Platt et al. | |
| 11,475,076 B2 | 10/2022 | Birnbaum et al. | |
| 11,501,220 B2 | 11/2022 | Birnbaum et al. | |
| 11,521,079 B2 | 12/2022 | Nichols et al. | |
| 11,561,684 B1 | 1/2023 | Paley et al. | |
| 11,561,986 B1 | 1/2023 | Sippel et al. | |
| 11,562,146 B2 | 1/2023 | Paley et al. | |
| 11,568,148 B1 | 1/2023 | Nichols et al. | |
| 2002/0083025 A1 | 6/2002 | Robarts et al. | |
| 2002/0107721 A1 | 8/2002 | Darwent et al. | |
| 2003/0004706 A1 | 1/2003 | Yale et al. | |
| 2003/0061029 A1 | 3/2003 | Shake | |
| 2003/0110186 A1 | 6/2003 | Markowski et al. | |
| 2003/0182102 A1 | 9/2003 | Corston-Oliver et al. | |
| 2003/0216905 A1 | 11/2003 | Chelba et al. | |
| 2004/0034520 A1 | 2/2004 | Langkilde-Geary et al. | |
| 2004/0083092 A1 | 4/2004 | Valles | |
| 2004/0138899 A1 | 7/2004 | Birnbaum et al. | |
| 2004/0174397 A1 | 9/2004 | Cereghini et al. | |
| 2004/0230989 A1 | 11/2004 | Macey et al. | |
| 2004/0255232 A1 | 12/2004 | Hammond et al. | |
| 2005/0027704 A1 | 2/2005 | Hammond et al. | |
| 2005/0028156 A1 | 2/2005 | Hammond et al. | |
| 2005/0049852 A1 | 3/2005 | Chao | |
| 2005/0125213 A1 | 6/2005 | Chen et al. | |
| 2005/0137854 A1 | 6/2005 | Cancedda et al. | |
| 2005/0273362 A1 | 12/2005 | Harris et al. | |
| 2006/0031182 A1 | 2/2006 | Ryan et al. | |
| 2006/0101335 A1 | 5/2006 | Pisciottano | |
| 2006/0181531 A1 | 8/2006 | Goldschmidt | |
| 2006/0212446 A1 | 9/2006 | Hammond et al. | |
| 2006/0218485 A1 | 9/2006 | Blumenthal | |
| 2006/0224570 A1 | 10/2006 | Quiroga et al. | |
| 2006/0253783 A1 | 11/2006 | Vronay et al. | |
| 2006/0271535 A1 | 11/2006 | Hammond et al. | |
| 2006/0277168 A1 | 12/2006 | Hammond et al. | |
| 2007/0132767 A1 | 6/2007 | Wright et al. | |
| 2007/0136657 A1 | 6/2007 | Blumenthal et al. | |
| 2007/0185846 A1 | 8/2007 | Budzik et al. | |
| 2007/0185847 A1 | 8/2007 | Budzik et al. | |
| 2007/0185861 A1 | 8/2007 | Budzik et al. | |
| 2007/0185862 A1 | 8/2007 | Budzik et al. | |
| 2007/0185863 A1 | 8/2007 | Budzik et al. | |
| 2007/0185864 A1 | 8/2007 | Budzik et al. | |
| 2007/0185865 A1 | 8/2007 | Budzik et al. | |
| 2007/0250479 A1 | 10/2007 | Lunt et al. | |
| 2007/0250826 A1 | 10/2007 | O'Brien | |
| 2007/0294201 A1 | 12/2007 | Nelken et al. | |
| 2008/0250070 A1 | 10/2008 | Abdulla et al. | |
| 2008/0256066 A1 | 10/2008 | Zuckerman et al. | |
| 2008/0304808 A1 | 12/2008 | Newell et al. | |
| 2008/0306882 A1 | 12/2008 | Schiller | |
| 2008/0313130 A1 | 12/2008 | Hammond et al. | |
| 2009/0019013 A1 | 1/2009 | Tareen et al. | |

(56) References Cited

U.S. PATENT DOCUMENTS

| | | |
|---|---|---|
| 2009/0030899 A1 | 1/2009 | Tareen et al. |
| 2009/0049041 A1 | 2/2009 | Tareen et al. |
| 2009/0083288 A1 | 3/2009 | LeDain et al. |
| 2009/0089100 A1 | 4/2009 | Nenov et al. |
| 2009/0119584 A1 | 5/2009 | Herbst |
| 2009/0144608 A1 | 6/2009 | Oisel et al. |
| 2009/0175545 A1 | 7/2009 | Cancedda et al. |
| 2009/0248399 A1 | 10/2009 | Au |
| 2010/0146393 A1 | 6/2010 | Land et al. |
| 2010/0161541 A1 | 6/2010 | Covannon et al. |
| 2010/0241620 A1 | 9/2010 | Manister et al. |
| 2011/0022941 A1 | 1/2011 | Osborne et al. |
| 2011/0044447 A1 | 2/2011 | Morris et al. |
| 2011/0077958 A1 | 3/2011 | Breitenstein et al. |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha et al. |
| 2011/0113334 A1 | 5/2011 | Joy et al. |
| 2011/0182283 A1 | 7/2011 | Van Buren et al. |
| 2011/0191417 A1 | 8/2011 | Rathod |
| 2011/0246182 A1 | 10/2011 | Allen |
| 2011/0249953 A1 | 10/2011 | Suri et al. |
| 2011/0288852 A1 | 11/2011 | Dymetman et al. |
| 2011/0307435 A1 | 12/2011 | Overell et al. |
| 2011/0314381 A1 | 12/2011 | Fuller et al. |
| 2012/0011428 A1 | 1/2012 | Chisholm |
| 2012/0041903 A1 | 2/2012 | Beilby et al. |
| 2012/0069131 A1 | 3/2012 | Abelow |
| 2012/0109637 A1 | 5/2012 | Merugu et al. |
| 2012/0158850 A1 | 6/2012 | Harrison et al. |
| 2012/0166180 A1 | 6/2012 | Au |
| 2013/0091031 A1 | 4/2013 | Baran et al. |
| 2013/0144606 A1 | 6/2013 | Birnbaum et al. |
| 2013/0145242 A1 | 6/2013 | Birnbaum et al. |
| 2013/0174026 A1 | 7/2013 | Locke |
| 2013/0246934 A1 | 9/2013 | Wade et al. |
| 2013/0275121 A1 | 10/2013 | Tunstall-Pedoe |
| 2014/0351281 A1 | 11/2014 | Tunstall-Pedoe |
| 2015/0186504 A1 | 7/2015 | Gorman et al. |
| 2015/0347391 A1 | 12/2015 | Chen et al. |
| 2015/0356463 A1 | 12/2015 | Overell et al. |
| 2016/0019200 A1 | 1/2016 | Mien |
| 2016/0162445 A1 | 6/2016 | Birnbaum et al. |
| 2016/0328365 A1 | 11/2016 | Birnbaum et al. |
| 2017/0060857 A1 | 3/2017 | Imbruce et al. |
| 2017/0344518 A1 | 11/2017 | Birnbaum et al. |
| 2021/0192132 A1 | 6/2021 | Birnbaum et al. |
| 2021/0192144 A1 | 6/2021 | Paley et al. |
| 2022/0114206 A1 | 4/2022 | Platt et al. |
| 2022/0284195 A1 | 9/2022 | Platt et al. |

OTHER PUBLICATIONS

Iman Saleh; A Reusable Model for Data-Centric Web Services; 2009; Springer-Verlag Berlin; pp. 288-297 (Year: 2009).*

Allen et al., "StatsMonkey: A Data-Driven Sports Narrative Writer", Computational Models of Narrative: Papers from the AAAI Fall Symposium, Nov. 2010, 2 pages.

Andersen, P., Hayes, P., Huettner, A., Schmandt, L., Nirenburg, I., and Weinstein, S. (1992). Automatic extraction of facts from press releases to generate news stories. In Proceedings of the third conference on Applied natural language processing. (Trento, Italy). ACM Press, New York, NY, 170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI), Munich.

Asset Economics, Inc. (Feb. 11, 2011).

Bailey, P. (1999). Searching for Storiness: Story-Generation from a Reader's Perspective. AAAI Technical Report FS-99-01.

Bethem, T., Burton, J., Caldwell, T., Evans, M., Kittredge, R., Lavoie, B., and Werner, J. (2005). Generation of Real-time Narrative Summaries for Real-time Water Levels and Meteorological Observations in PORTS®. In Proceedings of the Fourth Conference on Artificial Intelligence Applications to Environmental Sciences (AMS-2005), San Diego, California.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finland, pp. 318-320.

Boyd, S. (1998). TREND: a system for generating intelligent descriptions of time series data. Paper presented at Proceedings of the IEEE international conference on intelligent processing systems (ICIPS-1998).

Dehn, N. (1981). Story generation after TALE-SPIN. In Proceedings of the Seventh International Joint Conference on Artificial Intelligence. (Vancouver, Canada).

Dramatica Pro version 4, Write Brothers, 1993-2006, user manual.

Gatt, A., and Portet, F. (2009). Text content and task performance in the evaluation of a Natural Language Generation System. Proceedings of the Conference on Recent Advances in Natural Language Processing (RANLP-09).

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22, pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather Forecasts. IEEE Expert, 9 (2), 45.

Hargood, C., Millard, D. and Weal, M. (2009) Exploring the Importance of Themes in Narrative Systems.

Hargood, C., Millard, D. and Weal, M. (2009). Investigating a Thematic Approach to Narrative Generation, 2009.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedings, pp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent Systems, PAIS-08.

Kittredge, R., and Lavoie, B. (1998). MeteoCogent: A Knowledge-Based Tool For Generating Weather Forecast Texts. In Proceedings of the American Meteorological Society AI Conference (AMS-98), Phoenix, Arizona.

Kittredge, R., Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Association for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Washington, DC.

McKeown, K., Kukich, K., & Shaw, J. (1994). Practical issues in automatic documentation generation. 4th Conference on Applied Natural Language Processing, Stuttgart, Germany, pp. 7-14.

Meehan, James R., Tale-Spin. (1977). An Interactive Program that Writes Stories. In Proceedings of the Fifth International Joint Conference on Artificial Intelligence.

Memorandum Opinion and Order for O2 Media, LLC v. Narrative Science Inc., Case 1:15-cv-05129 (N.D. IL), Feb. 25, 2016, 25 pages (invalidating claims of U.S. Pat. Nos. 7,856,390, 8,494,944, and 8,676,691 owned by O2 Media, LLC.

Moncur, W., and Reiter, E. (2007). How Much to Tell? Disseminating Affective Information across a Social Network. Proceedings of Second International Workshop on Personalisation for e-Health.

(56) References Cited

OTHER PUBLICATIONS

Moncur, W., Masthoff, J., Reiter, E. (2008) What Do You Want to Know? Investigating the Information Requirements of Patient Supporters. 21st IEEE International Symposium on Computer-Based Medical Systems (CBMS 2008), pp. 443-448.
Movie Magic Screenwriter, Write Brothers, 2009, user manual.
Notice of Allowance for U.S. Appl. No. 12/779,668 dated Dec. 14, 2012.
Notice of Allowance for U.S. Appl. No. 12/779,683 dated Nov. 26, 2012.
Office Action for U.S. Appl. No. 12/779,636 dated Apr. 25, 2013.
Office Action for U.S. Appl. No. 12/779,668 dated Apr. 6, 2012.
Office Action for U.S. Appl. No. 12/779,683 dated Apr. 9, 2012.
Office Action for U.S. Appl. No. 13/464,635 dated Jun. 5, 2015.
Office Action for U.S. Appl. No. 13/464,716 dated Feb. 5, 2013.
Office Action for U.S. Appl. No. 13/464,635 dated Feb. 22, 2016.
Portet, F., Reiter, E., Gatt, A., Hunter, J., Sripada, S., Freer, Y., and Sykes, C. (2009). Automatic Generation of Textual Summaries from Neonatal Intensive Care Data. Artificial Intelligence.
Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07), pp. 227-236.
Prosecution History for U.S. Appl. No. 12/779,636, now U.S. Pat. No. 8,688,434, filed May 13, 2010.
Prosecution History for U.S. Appl. No. 12/779,668, now U.S. Pat. No. 8,374,848, filed May 13, 2010.
Prosecution History for U.S. Appl. No. 12/779,683, now U.S. Pat. No. 8,355,903, filed May 13, 2010.
Prosecution History for U.S. Appl. No. 13/186,308, now U.S. Pat. No. 8,775,161, filed Jul. 19, 2011.
Prosecution History for U.S. Appl. No. 13/186,329, now U.S. Pat. No. 8,892,417, filed Jul. 19, 2011.
Prosecution History for U.S. Appl. No. 13/186,337, now U.S. Pat. No. 8,886,520, filed Jul. 19, 2011.
Prosecution History for U.S. Appl. No. 13/464,635, filed May 4, 2012.
Prosecution History for U.S. Appl. No. 13/464,716, now U.S. Pat. No. 8,630,844, filed May 4, 2012.
Reiter et al., "Building Applied Natural Generation Systems", Cambridge University Press, 1995, pp. 1-32.
Reiter, E. (2007). An architecture for Data-To-Text systems. In: Busemann, Stephan (Ed.), Proceedings of the 11th European Workshop on Natural Language Generation, pp. 97-104.
Reiter, E., Gatt, A., Portet, F., and van der Meulen, M. (2008). The importance of narrative and other lessons from an evaluation of an NLG system that summarises clinical data. Proceedings of the 5th International Conference on Natural Language Generation.
Reiter, E., Sripada, S., Hunter, J., Yu, J., and Davy, I. (2005). Choosing words in computer-generated weather forecasts Artificial Intelligence, 167:137-169.
Prosecution History for U.S. Appl. No. 13/464,675, now U.S. Pat. No. 10,657,201, filed May 4, 2012.
Response to Office Action for U.S. Appl. No. 12/779,668 dated Apr. 6, 2012.
Response to Office Action for U.S. Appl. No. 12/779,683 dated Apr. 9, 2012.
Response to Office Action for U.S. Appl. No. 13/464,635 dated Feb. 22, 2016.
Response to Office Action for U.S. Appl. No. 13/464,635 dated Jun. 4, 2015.
Riedl et al., "From Linear Story Generation to Branching Story Graphs", IEEE Computer Graphics and Applications, 2006, pp. 23-31.
Riedl et al., "Narrative Planning: Balancing Plot and Character", Journal of Artificial Intelligence Research, 2010, pp. 217-268, vol. 39.
Robin, J. (1996). Evaluating the portability of revision rules for incremental summary generation. Paper presented at Proceedings of the 34th. Annual Meeting of the Association for Computational Linguistics (ACL'96), Santa Cruz, CA.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New York, NY 105-115.
Sripada, S., Reiter, E., and Davy, I. (2003). SumTime-Mousam: Configurable Marine Weather Forecast Generator. Expert Update 6(3):4-10.
Storyview, Screenplay Systems, 2000, user manual.
Theune, M., Klabbers, E., Odijk, J., dePijper, J., and Krahmer, E. (2001) "From Data to Speech: A General Approach", Natural Language Engineering 7(1): 47-86.
Thomas, K., and Sripada, S. (2007). Atlas.txt: Linking Geo-referenced Data to Text for NLG. Paper presented at Proceedings of the 2007 European Natural Language Generation Workshop (ENLG07).
Thomas, K., and Sripada, S. (2008). What's in a message? Interpreting Geo-referenced Data for the Visually-impaired. Proceedings of the Int. conference on NLG.
Thomas, K., Sumegi, L., Ferres, L., and Sripada, S. (2008). Enabling Access to Geo-referenced Information: Atlas.txt. Proceedings of the Cross-disciplinary Conference on Web Accessibility.
U.S. Appl. No. 12/779,636, filed May 13, 2010 (Birnbaum et al.).
U.S. Appl. No. 12/779,668, filed May 13, 2010 (Birnbaum et al.).
U.S. Appl. No. 12/779,683, filed May 13, 2010 (Birnbaum et al.).
U.S. Appl. No. 13/186,308, filed Jul. 19, 2011 (Nichols et al.).
U.S. Appl. No. 13/186,329, filed Jul. 19, 2011 (Nichols et al.).
U.S. Appl. No. 13/186,337, filed Jul. 19, 2011 (Nichols et al.).
U.S. Appl. No. 13/186,346, filed Jul. 19, 2011 (Nichols et al.).
U.S. Appl. No. 13/464,635, filed May 4, 2012 (Nichols et al.).
U.S. Appl. No. 13/464,716, filed May 4, 2012 (Nichols et al.).
Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Graphical Displays in Neonatal Intensive Care. Applied Cognitive Psychology.
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).
Mack et al., "A Framework for Metrics in Large Complex Systems", IEEE Aerospace Conference Proceedings, 2004, pp. 3217-3228, vol. 5, doi: 10.1109/AERO .2004.1368127.
Segel et al., "Narrative Visualization: Telling Stories with Data", Stanford University, Oct. 2010, 10 pgs.
Smari et al., "An Integrated Approach to Collaborative Decision Making Using Computer-Supported Conflict Management Methodology", IEEE International Conference on Information Reuse and Integration, 2005, pp. 182-191.

\* cited by examiner

| Angle Name | Status | Interestingness | Mutex | Bound Args |
|---|---|---|---|---|
| TeammmateTeamedUp | Valid | 14.0 | None | <[game: <Game instance at 4396814480>,]> |
| VeryBackAndForth | Valid | 6.5 | lead_changes | <[game: <Game instance at 4396814480>,]> |
| Default | Valid | 1.0 | preview_open | <[game: <Game instance at 4396814480>,]> |
| DefaultWin | Valid | 6.33333333333 | best_player | <[game: <Game instance at 4396814480>,]> |
| EarlySecondHalfRun | Valid | 6.0 | scoring_run | <[game: <Game instance at 4396814480>,]> |
| BackAndForth | Mutex already matched | 6.5 | lead_changes | [] |
| SecondHalfScoringDrought | Failed test | None | None | <[game: <Game instance at 4396814480>,]> |
| UpsetGame | Failed test | None | None | <[game: <Game instance at 4396814480>,]> |
| LateScoringRun | Failed test | None | None | <[game: <Game instance at 4396814480>,]> |
| BuzzerBeater | Failed test | None | late_lead | <[game: <Game instance at 4396814480>,]> |
| TakeTheLeadLate | Failed test | None | late_lead | <[game: <Game instance at 4396814480>,]> |
| HeroicPerformance | Failed test | None | best_player | <[game: <Game instance at 4396814480>,]> |
| HeroicPerformanceDefeat | Failed test | None | best_player | <[game: <Game instance at 4396814480>,]> |
| Comeback | Failed test | None | None | <[game: <Game instance at 4396814480>,]> |
| OneLeadsMany | Failed test | None | best_player | <[game: <Game instance at 4396814480>,]> |

CONFIGURABLE AND PORTABLE SYSTEM FOR GENERATING NARRATIVES

CROSS-REFERENCE AND PRIORITY CLAIM TO RELATED PATENT APPLICATIONS

This patent application is a continuation of patent application Ser. No. 13/464,675, filed May 4, 2012, which is a continuation of patent application Ser. No. 12/986,996, filed Jan. 7, 2011, wherein the entire disclosures of each of which are incorporated herein by reference.

This patent application is related to the following patent applications (1) patent application Ser. No. 12/986,972, filed Jan. 7, 2011, and (2) patent application Ser. No. 12/986,981, filed Jan. 7, 2011, wherein the entire disclosures of each of which are incorporated herein by reference.

This patent application is further related to (1) patent application Ser. No. 13/464,635, filed May 4, 2012, and entitled "Use of Tools and Abstraction in a Configurable and Portable System for Generating Narratives", now U.S. Pat. No. 9,697,178, and (2) patent application Ser. No. 13/464,716, filed May 4, 2012, and entitled "Configurable and Portable Method for Generating Narratives", now U.S. Pat. No. 8,630,844.

The present invention pertains to a configurable and portable method and system for generating story narratives from data and other information. The process of generating narratives from data is described in previous patent applications each filed on May 13, 2010, said applications being application Ser. Nos. 12/779,636; 12/779,668 and 12/779,683, each of which is incorporated by reference herein.

BACKGROUND

Data and information pertaining to events, circumstances, and entities in various types of domains, such as sports, business and finance, crime, education, real estate, etc., is readily available. The subject invention and previous inventions described above function to use such available data and information to automatically create narrative stories that describes domain event(s), circumstance(s) and/or entity(ies) in a comprehensible and compelling, e.g., audience customized, manner.

The process comprises the following main steps:
1. Inputting relevant raw data
2. Computing derived features
3. Determining applicable angles
4. Ranking, selecting, and ordering angles
5. Generating the narrative in natural language The output of the first four steps is a language-independent outline of the points, such as facts and interpretations, which constitute the story narrative.

The data and computational elements appropriate for use in each of these steps—raw data, derivations and derived features, angles and applicability conditions, ranking, selection, and ordering metrics and methods, and linguistic/lexical elements (words and parameterizable phrases)—are not universal. On the contrary, they depend critically upon the content vertical under consideration (e.g., sports, and in fact the particular sport, business, etc.), the genre or type of story being written (e.g., preview, recap, top 10 ranking, profile, etc.), the focus of the story (e.g., a company, a team, a person, etc.), its audience (e.g., experts, fans, children, etc.), and other factors.

For example: the vertical might be basketball; the type of story might be a "top 10 ranking" story (in which the top 10 competitors in some set are listed in order, with short descriptions of ranking changes and reasons for each entry); the foci might be players in a given league (e.g., the Big Ten); and the audience might be Big Ten fans. The data and computational elements necessary to appropriately carry out each of the five components of the process outlined above in order to generate such narratives—"top 10 rankings of Big Ten Basketball players"—is dependent on all these defining factors or characteristics of such narratives. To take an obvious example, because the focus is on ranking players rather than teams, the appropriate raw data, derived features, and angles revolve around individual player metrics—e.g., points scored, rebounds, etc.—as opposed to team records—e.g., games won or lost, point spreads, etc.

Because of their dependence on these defining characteristics or factors of the narratives to be generated, adapting a narrative generation system to a new content vertical, story type, focus, and/or audience, etc., requires specifying these computational and data components appropriately. In other words, in order to adapt the system to new story types, content verticals, etc., you must specify the appropriate performance and behavior required to carry out each component of the process outlined above as well as the appropriate data representations required for each step. In particular, you must specify, among other things:

1. The raw features that must be taken as input, how they will be input, and the appropriate data models for structuring, organizing and representing these features in the system.
2. The derived features that must be computed, how they are to be computed, and the appropriate data models for structuring, organizing, and representing the results in the system.
3. The appropriate angles, their conditions of applicability, how those conditions are to be computed, and how the results are to be structured, organized, and represented.
4. Appropriate methods for ranking, selecting, and ordering these angles, and how the results of these processes are to be organized and represented.
5. Appropriate data and methods for generating the resulting narrative in natural language, and appropriate data models for structuring, organizing and representing these data and methods.

To the extent that the necessary derivations, angles and their applicability conditions, etc., are specified as procedures directly expressed as code in some general purpose programming language, specification of the computational and data elements delineated above will require a significant programming effort. Adapting a system architected in this way to a new content vertical, story type, focus, and/or audience will therefore require skilled developers and significant time and effort to design and implement these procedures, in many cases from scratch. As a result, a system architected to carry out the processes described above, where the necessary components are specified directly in a general purpose programming language, is not horizontally scalable—it is relatively difficult and expensive to adapt such a system to a new content vertical, story type, etc.

SUMMARY

The present invention provides for a computer readable media having stored thereon computer executable instructions for automatically generating a narrative story using a specification comprising a story specification providing a high level specification of computational and data components and the story specification having a hierarchical description of a narrative structure and key content elements and the story specification is parsed to provide the executable computational and data elements required to automatically generate a narrative story. In an embodiment, the story specification may comprise one or more content blocks. In an embodiment, the story specification may describe how to use data to generate the narrative story.

In an embodiment, the story specification may provide a modular, standard and uniform structure for configuring the computer readable media to generate the narrative story. In an embodiment, the story specification may provide for a level of abstraction that allows for authoring and editing of the modular structure for configuring the computer readable media at a high level without the necessity of reviewing computer executable code. In an embodiment, the story specification may provide for compositionality that allows for the use of configuration tools by humans for developing modular structures, without the necessity of authoring or reviewing computer executable code. In an embodiment, the story specification may comprise one or more content blocks and at least one content block directly or indirectly specifying one of a model, raw data, angle, derived feature, focus, organizing principle or blueprint set.

In a further embodiment, the invention provides a computer readable media having stored thereon computer executable instructions for generating a narrative story using standard and uniform structures and data, the instructions, when executed by a computing device, performing steps comprising receiving domain related data and a story specification, parsing the story specification to provide constituent components, transforming the constituent components into executable code, instantiating content blocks having at least one feature for the domain according to the story specification and rendering the narrative story using the content blocks.

In an embodiment, each content block may be configured as a combination of the constituent components. In an embodiment, the constituent components may include at least one of a model, raw data, derived feature, angle, focus, organizing principle or blueprint set. In an embodiment, the content block may compute derived features, test applicability conditions for an angle and generate a language independent outline. In an embodiment, a blueprint set may be provided by a content block, angle and/or feature in the content block. In an embodiment, a blueprint set may comprise parameterizable blueprints and one or more of the blueprints will be selected and parameterized to express the angle and/or feature in a natural language. In an embodiment, the natural language may include one of English, German, Spanish, French or Chinese.

In an embodiment, a first blueprint set may be replaceable by a second blueprint set for the angle. In an embodiment, a first blueprint set may be replaceable by a second blueprint set for the content block. In an embodiment, the blueprint set may provide for multiple expressions of words, phrases or constructions in order to avoid repetitiveness in the narrative story.

In an embodiment, the story specification may be parameterized through use of at least one feature that is used to instantiate the content blocks. In an embodiment, the feature may be expressed abstractly and computation of the derived feature is determined automatically from another derived feature. In an embodiment, the narrative story may be rendered by using one or more angles or features identified through use of the story specification. In an embodiment, the angle may be parameterized using raw data and derived features. In an embodiment, the angle may specify connections to other angles. In an embodiment, the high-level computational and data components that rendered narrative story may be edited using an editorial assessment tool by reviewing execution traces of one of the story specification or constituent components. In an embodiment, the story specification or constituent components may be authored and/or edited using a configuration tool using an iterative approach. In an embodiment, a platform specified in the computer readable media may be improved using a platform debugging tool with the story specification.

In another embodiment the invention provides for a method for automatically generating a narrative story executed by computer executable instructions that when executed by a computing device, perform the steps of receiving raw data, computing a derived feature using the raw data, testing angles using the derived feature, instantiating a content block using the angles, instantiating a blueprint set specified by the content block and generating the narrative story using the blueprint set. In an embodiment, a model may be a structured object of interest in a content vertical. In an embodiment, the content vertical may include one of players, teams, roles, plays, games, financial information, portfolio information, medical data or real estate data.

In an embodiment, the derived feature may include key plays and attributes of key plays. In an embodiment, the angles may specify conditions of applicability in terms of properties of the raw data and/or derived feature. In an embodiment, the content block may be configured by specifying one of models, raw data, derived features, foci, angles, blueprint sets, or organizing principles. In an embodiment, the blueprint set may comprise a blueprint that includes one of a word token, phrase block token or punctuation token. In an embodiment, constituent components of the content block may be authored, reviewed and/or edited using one of a configuration tool, an editorial assessment tool or a platform debugging tool.

In a further embodiment the invention provides a computer readable media having stored thereon computer executable instructions for automatically generating a narrative story using data and information, the instructions, when executed by a computing device, performing steps comprising receiving domain related data, using the received domain related data to parameterize a story specification including a content block, identifying one or more elements within the received domain related data to provide information for the content block and rendering the narrative story using a blueprint set having a phrase parameterized by data and the one or more elements identified through use of the story specification.

In an embodiment, the invention provides a computer readable media having stored thereon computer executable instructions for automatically generating a narrative story using data, the instructions, when executed by a computing device, performing steps comprising receiving domain related data and information, using the received domain related data and information to parameterize a story specification having at least one content block, and using the at least one derived feature for the domain to instantiate the content block and provide an outline, identifying entities within the domain related data and deriving domain related data based on the identified entities to compute the outline selecting an angle for the portion of the narrative determined by the content block and deriving domain related data based on the angle to produce the outline and rendering a narrative story from the outline.

In an embodiment, the story specification may comprise constituent components relevant to a sports related content vertical including one of archery, basketball, baseball, bowling, car racing, cricket, curling, diving, dog racing, driving, football, golf, gymnastics, hockey, horse racing, jai-alai, kickball, lacrosse, motor sports, Olympic events, ping-pong, rowing, soccer, skating, skiing, snow-boarding, swimming, tennis, track and field events, volleyball, water-polo, wrestling or yacht racing. In an embodiment, the angle may include one of a come from behind victory, biggest missed opportunity, noteworthy play, high internal metrics but low resulting external metrics, blow-out or a team or player unable to capitalize on opportunities. In an embodiment, the outline may be a language-independent representation of the angles, features, and data to be expressed in the narrative and may be used to generate a narrative in multiple human readable languages. In an embodiment, the rendered story is saved with multiple other rendered stories and all of the multiple saved rendered stories are indexed according to content block, outline, angle, blueprint set, story specification or performance value.

While the forgoing provides a general explanation of the subject invention, a better understanding of the objects, advantages, features, properties and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 8 illustrates an exemplary screen shot of the testing of each angle's applicability conditions and the their results in accordance with the process illustrated in

FIG. 4;

Figure 9:
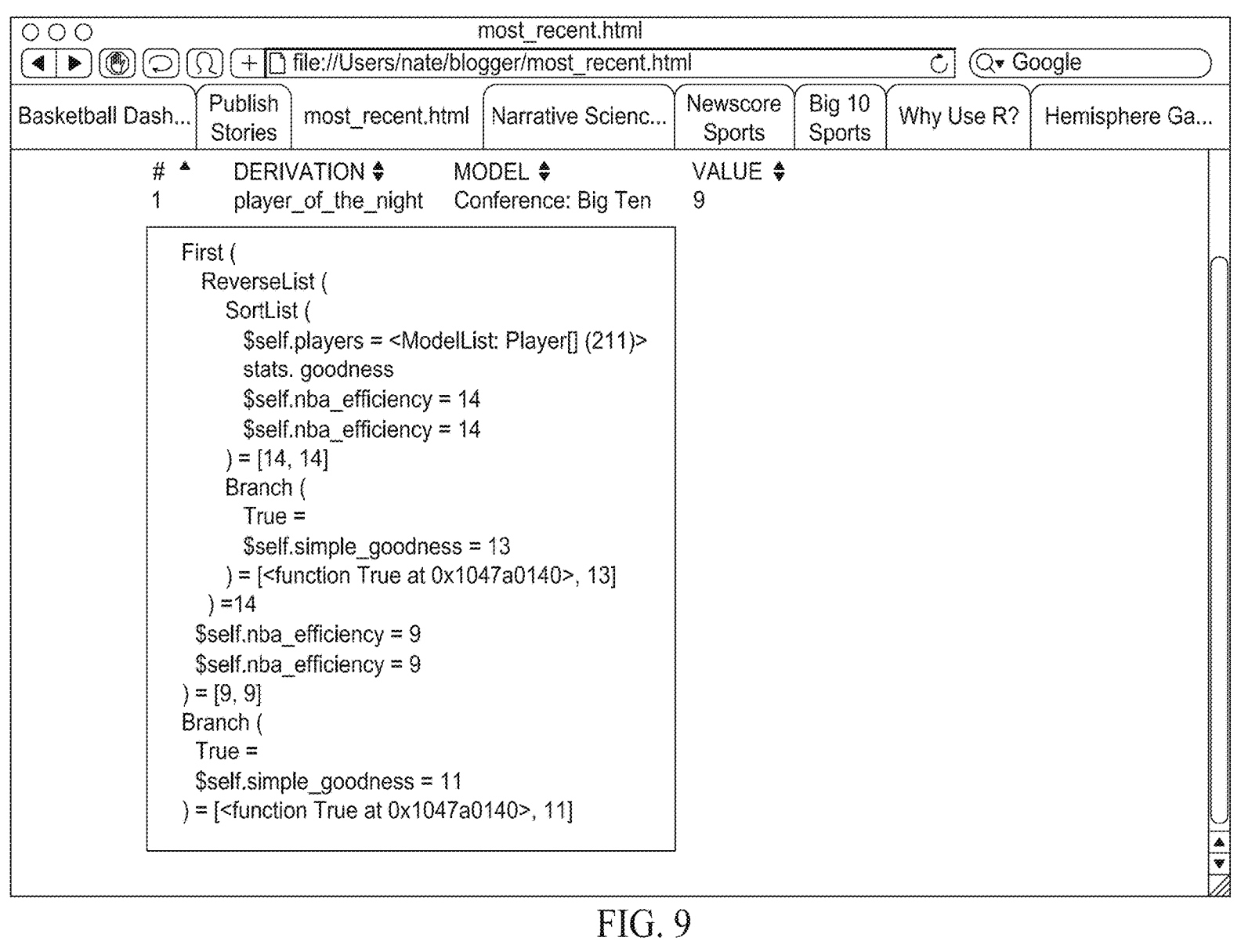

FIG. 9 illustrates an exemplary screen shot of derived features used in accordance with the process illustrated in FIG. 4.

DETAILED DESCRIPTION

Figure 1:
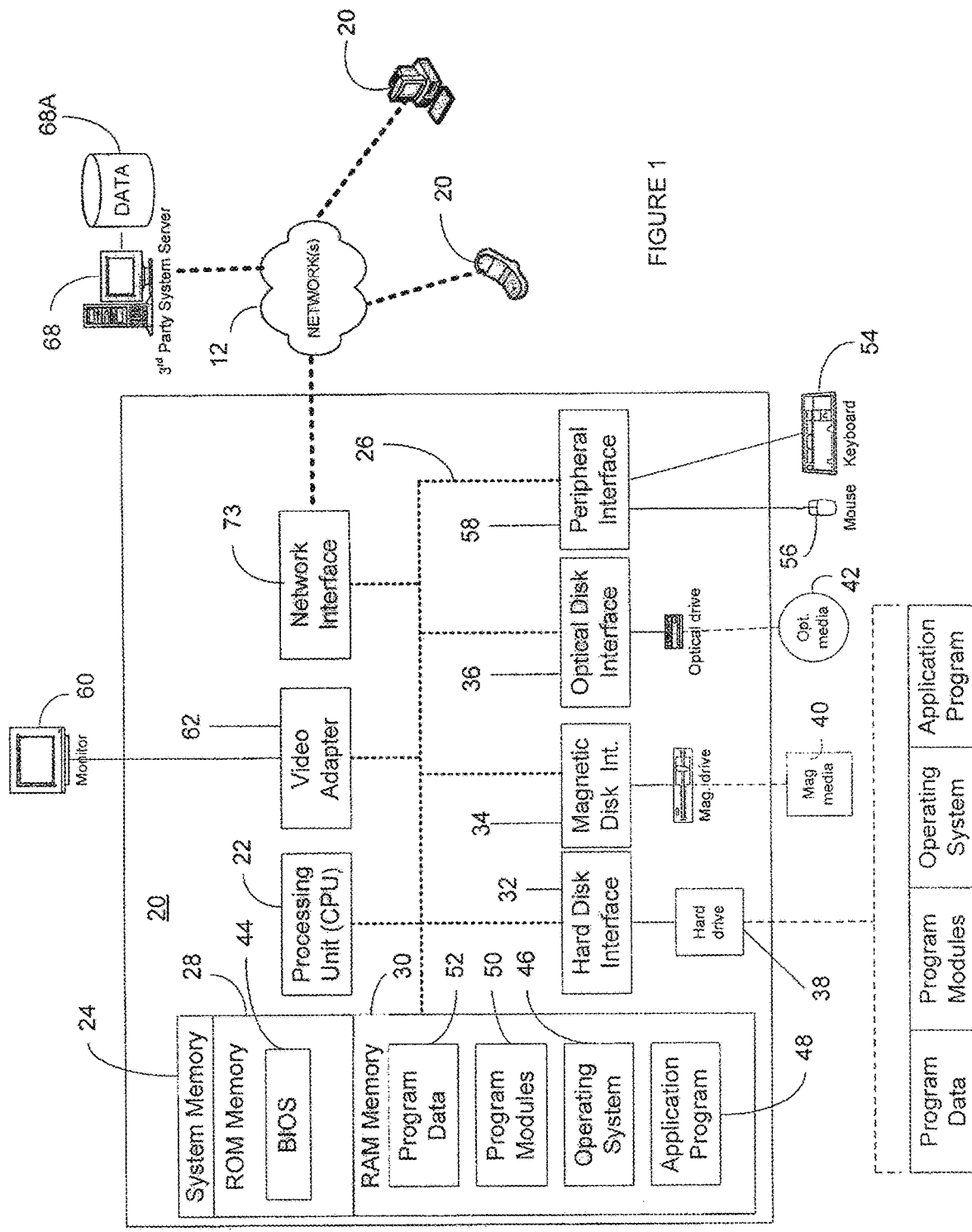
FIG. 1 illustrates in block diagram form components of an exemplary network system which functions to use data and information to automatically create a narrative story.

A system and method for specifying computational and data components necessary to automatically create narrative stories of various types using data and information pertaining to event(s), circumstance(s), and/or entity(ies) in a domain or domains, e.g., sports, business, financials, crime, education, medical, census, social indicators, etc., and for utilizing these specifications to automatically create such narrative stories, is hereinafter described. As shown in FIG. 1, the system and method is preferably implemented in the context of a plurality of processing devices linked via a network, such as the World Wide Web or the Internet. In this regard, a processing device 20, illustrated in the exemplary form of a computer system, is provided with executable instructions to, for example, provide a means to access data and information pertaining to one or more domain events and to create from such accessed data and information narrative stories. Generally, the computer executable instructions reside in program modules which may include routines, programs, objects, components, data structures, etc. that perform particular tasks or implement particular abstract data types. Accordingly, those skilled in the art will appreciate that the processing device 20 may be embodied in any device having the ability to execute instructions such as, by way of example, a personal computer, mainframe computer, personal-digital assistant ("PDA"), cellular telephone, or the like. Furthermore, while described and illustrated in the context of a single processing device 20, those skilled in the art will also appreciate that the various tasks described hereinafter may be practiced in a distributed environment having multiple processing devices 20 linked via a local or wide-area network whereby the executable instructions may be associated with and/or executed by one or more of multiple processing devices 20.

For performing the various tasks in accordance with the executable instructions, the processing device 20 preferably includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures (e.g., data and information that is to be used to generate a story), program modules and other data for the processing device 20. Those skilled in the art will further appreciate that other types of computer readable media that can store data may be used for these same purposes. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as application programs that function to create a story from domain event data and information, provide a user interface that allows a user to specify parameters for use in generating a customized, narrative story, etc.), other program modules 50, and/or program data 52. Still further, computer-executable instructions may be downloaded to one or more of the computing devices as needed, for example, via a network connection.

An end-user or operator, may enter commands (e.g., to customize narrative stories to an intended audience, etc.) and information (e.g., to key in data and/or information to be used in generating narrative stories, to indicate the logical location of that information in a network or file system, etc.) into the processing device 20 through input devices such as a keyboard 54 and/or a pointing device 56. While not illustrated, other input devices usable for these purposes may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information, a monitor 60 or other type of display device may also be connected to the bus 26 via an interface, such as a video adapter 62. In addition to the monitor 60, the processing device 20 may also include other peripheral output devices, not shown, such as speakers and printers.

The processing device 20 may also utilize logical connections to one or more remote processing devices, such as the third party data and information system server 68 having associated data repository 68A. In this regard, while the third party system server 68 has been illustrated in the exemplary form of a computer, it will be appreciated that the third party system server 68 may, like processing device 20, be any type of device having processing capabilities. Again, it will be appreciated that the third party system server 68 need not be implemented as a single device but may be implemented in a manner such that the tasks performed by the third party system server 68 are distributed to a plurality of processing devices linked through a communication network.

For performing tasks as needed, e.g., to provide domain data and/or information to processing device 20, the third party system server 68 may include many or all of the elements described above relative to the processing device 20. By way of further example, the third party system server 68 includes executable instructions for, among other things, handling database queries, providing results from database queries, handling search requests, providing search results, providing RSS feeds, etc. Communications between the processing device 20 and the third party system server 68 may be exchanged via a further processing device, such as a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the processing device 20, or portions thereof, may be stored in the memory storage device(s) of the third party system server 68.

Figure 2:
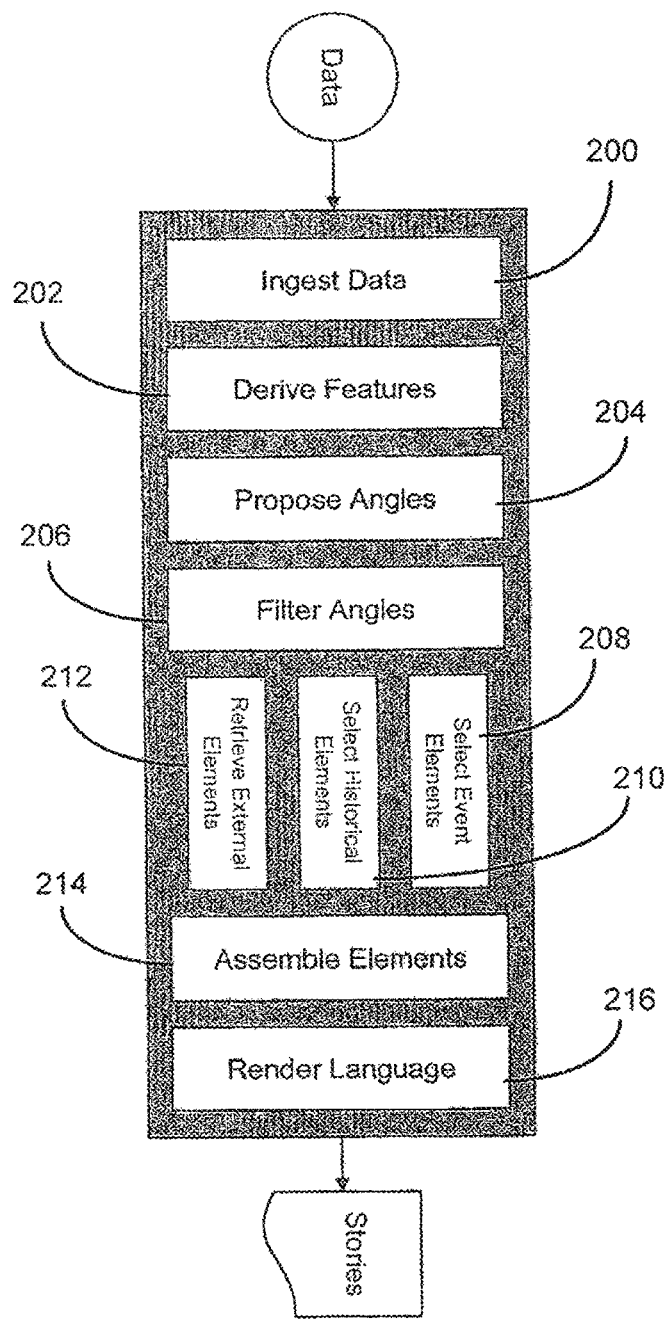
FIG. 2 illustrates in flow chart form an embodiment of a rudimentary form of the present invention for using data and information to automatically create a narrative story.

Turning now to FIG. 2, an embodiment of a rudimentary form of the present invention is described for creating a narrative story from domain data and information, the processing device 20 is provided with one or more applications that function to ingest data and information (individually and collectively referred to hereinafter as "data") 200, derive from the data one or more features 202, propose angles for the narrative story 204, filter and prioritize the angles for the narrative story 206, select event or other situational elements for inclusion in/with the narrative story 208, select historical, forward looking, or other contextual elements for inclusion in/with the narrative story 210, retrieve external elements for inclusion in/with the narrative story 212, assemble the elements for inclusion in/with the narrative story 214, and render the narrative story 216, e.g., in a given language, at a given reading level, etc. As will be described in greater detail below, the rendered, narrative story may be self-contained, i.e., all of the elements may be embedded directly within the story narrative itself, or the rendered, narrative story may include one or more elements that are provided to accompany the story narrative, e.g., elements such as video, sound, text, etc. that may be included with the story or within sidebars, footnotes, be linked to, and the like. It will also be appreciated that the story need not be rendered solely as a written story but can be rendered in selected video clips, audio clips, etc. with or without additional textual or audio commentary. Still further the story can be rendered in animation or as a graphical simulation as desired. For example, via use of the subject invention a story can be presented using animation to provide a reenactment of aspects of a domain event.

As noted above, the input to the system is data. In the exemplary case of a sporting event such as a baseball game, this input data may include event data in the form of a game box score, historical data about a team and/or player, more general game, player, team and/or league history data (such as records), and forward-looking data about games, players, teams, league schedules, etc. The input data might also include derived features produced by external sources, including expectations based on computations and/or aggregations (such as forecasts, predictions, or odds produced by betting markets). Generally, as shown in FIG. 1, applications 48 may be provided that allow the input data 304 to be pulled/scraped by the processing device 20 from an external source, such as third party system server 68, pushed to and received by the processing device 20 from an external source, such as third party system server 68, read by the processing device 20 from a storage media, such as magnetic media 40 or optical media 42, be manually provided to the processing device 20 via use of keyboard 54, scanner, microphone, etc. and the like without limitation. It is to be additionally appreciated that the domain input data that is thus ingested by the processing device 20 will typically be structured numeric and/or quasi-numeric data, i.e., the data will fall into particular fields and/or categories and will be known to relate to specific events, situations, entities, etc., or aggregations thereof. For example, in the exemplary case of a baseball game, the event data may consist of one or more of a box score, line score, and play-by-play data (play-by-play data being quasi-numeric data in that it is traditionally recorded and conveyed in telegraphic English with a small, fixed lexicon and, as such, is basically equivalent to numeric data). In general the nature/structure of such event data is pre-determined by conventions of the domain or domain experts.

Once the input data is ingested into the system, e.g., received, parsed considering the domain conventions, and stored in an XML, or other data format, the system then functions to compute derived features for the input data (depending upon domain, genre of story, circumstances, etc., the system may compute no derived features; or domain features may be supplied to the system from external sources). In this regard, the derived features function to help determine aspects of a domain situation (e.g., events, circumstances, entities, etc.) that are likely candidates for inclusion in a story narrative, i.e., given the vast amount of data available about any given situation, the derived features function to support the capacity of the system to pick out the most critical aspects of the situation that may be desirable to include in a narrative description. Generally, the derived features of a domain situation are developed based on computations and comparisons involving input data (or other derived features), describe or pertain to certain aspects of the situations, events, entities, etc., of interest, and are typically numerical or Boolean in nature.

Thus, for example, derived features might include determining if the input data matches a particular pattern, has a particular kind of value (e.g., is a maximum or minimum), shows a delta (change) in a feature that is significant in some way (e.g., is above a certain threshold, significantly greater that the median change in that value over some interval etc.), crosses a particular threshold (e.g., zero, or a prior record etc.), deviates from expectations, results in a significant change in the output of a predictive model, etc. The particular derived features that are to be used to help identify aspects of a domain situation that may be desirable to include in a story narrative may be selected based upon various parameters such as one or more of the domain itself (e.g., the computations and comparisons for events such as a baseball game, a football game, stock valuation, etc. may be different), a focus for the narrative story (e.g., the computations and comparisons may be selected to focus on game input data generally, on input data associated with a specific individual participating in the game, etc.), a genre for the narrative story (e.g., the computations and comparisons may be selected to focus on a season, a career, a single game, two specific games, two specific companies, etc.), a length for the story, etc. As will be appreciated, the parameters that are used to select derived features for application to a domain event may be specified to the system via use of an appropriately provided user interface, configuration files, etc. It will also be appreciated that derived features may range from the general to the specific and that derived features may be built upon other derived features.

A. General approach

To overcome the problems of adaptability to new content verticals, story types, etc. outlined in the Background section above, it is necessary to find an alternative approach in which the computational and data components of the narrative generation process can be easily specified and utilized in some form other than directly as code in a general purpose programming language. Specifically, three things are necessary:

1. High-level specifications that makes it possible to concisely and relatively easily describe the computational and data components required to carry out the operations necessary to generate a narrative in relatively abstract terms, while suppressing the algorithmic details of implementation;
2. An easily configurable platform that can utilize such specifications to carry out the appropriate algorithmic processes they require and to appropriately structure and organize the data manipulated by these processes as specified in order to actually generate narratives; and
3. Tools that enable non-programmers to develop such specifications relatively quickly and easily.

In other words, a narrative generation system that can be horizontally scaled—i.e., that is relatively portable and easily adaptable to new content verticals, story types, foci, audiences, etc.—requires a platform architecture and tools that support the development and use of high-level narrative specifications in terms of modular, standard and uniform structures, which thereby facilitate the portability and configurability of the necessary data and computational components of the system.

To meet these goals, we have developed specific solutions to all three aspects of the problem outlined above, namely, an approach to the high-level specification of the computational and data elements required to generate a narrative in terms of modular, standard and uniform structures; an easily configurable architecture and platform for narrative generation that supports the utilization of such specifications to generate a narrative; and tools to enable non-programmers to develop such specifications. The result is faster and less error-prone adaptation of the system to new content verticals, story types, etc., involving less programming effort and instead primarily editorial work. The specification model, platform, and tools we have developed support narrative generation over a wide range of content verticals and narrative structures, from highly dynamic event-driven stories about sporting events, to much less dynamic narratives that, for example, convey factual information about entities or categories such as cities or careers.

Developing a high-level approach to the specification of the appropriate computational and data elements required to generate a narrative is primarily a matter of "elevating" and abstracting decisions that were formerly implemented directly in code in a general purpose programming language into more explicit, modular and parameterizable structures or models that describe those elements in a way that suppresses the details of their algorithmic implementation. The result is a set of modular, standard and uniform structures or constituent components embodying the computational and data elements required to execute each phase of narrative generation process that focuses on the core logic of how those elements specifically determine the nature of the resulting narrative. This makes developing the computational and data elements necessary to carry out the steps involved in generating a narrative less a matter of developing code in a general purpose programming language, requiring attention to and expertise in these algorithmic details, and more a matter of specifying only this core logic that is specifically relevant to defining the narrative itself.

In addition, this abstraction makes it possible to specify the desired behavior in terms of structures or models that encapsulate the necessary information and decisions in a modular fashion that facilitates portability, configurability, and compositionality. More specifically, such abstraction makes it possible to build modular, standard and uniform structures that can be:

Shared in libraries for easy reuse
Placed in abstraction hierarchies so that more specific versions can inherit properties from more abstract ones
Easily combined and composed to form compound structures.

This makes the adaptation of the system to new content verticals, story types, etc., less a matter of developing new data and computational components, however specified, and more a matter of selecting, combining, and parameterizing—i.e., specifying the data they utilize—pre-existing structures to form the resulting high-level specifications. These structures express the necessary components in an abstract, modular and flexible manner, as well as substantially improving the brevity and understandability of the system and its components by directly expressing the most critical abstractions and relations.

In what follows, we will describe first, our approach to the high-level specification of the computational and data elements necessary to generate a narrative in terms of modular, standard and uniform structures or constituent components; second, our configurable architecture and platform for utilizing these specifications to actually generate a narrative; third, our tools for enabling non-programmers to develop these specifications; and then finally aspects of the specification model that support modularity and compositionality, facilitating the development of new specifications by combining elements of existing specifications.

B. High-Level Specification of Narratives

The primary construct of our approach to the high-level specification of the computational and data elements required to generate a given type of narrative in a given content vertical, etc., in terms of modular, standard and uniform structures, is the story specification. This is an explicit, hierarchical description or specification in relatively abstract terms of the narrative structure and key content elements of the story to be generated. Story specifications (or "story specs") incorporate a number of features critical for the story generation process including the Data Model depicted in FIG. 3. Specifically, the Story "Spec" 250 organizes the data and computational components required to generate a narrative of the given type, in a given content vertical, with given foci, for a given audience, meeting other high-level constraints of this sort.

Figure 6:
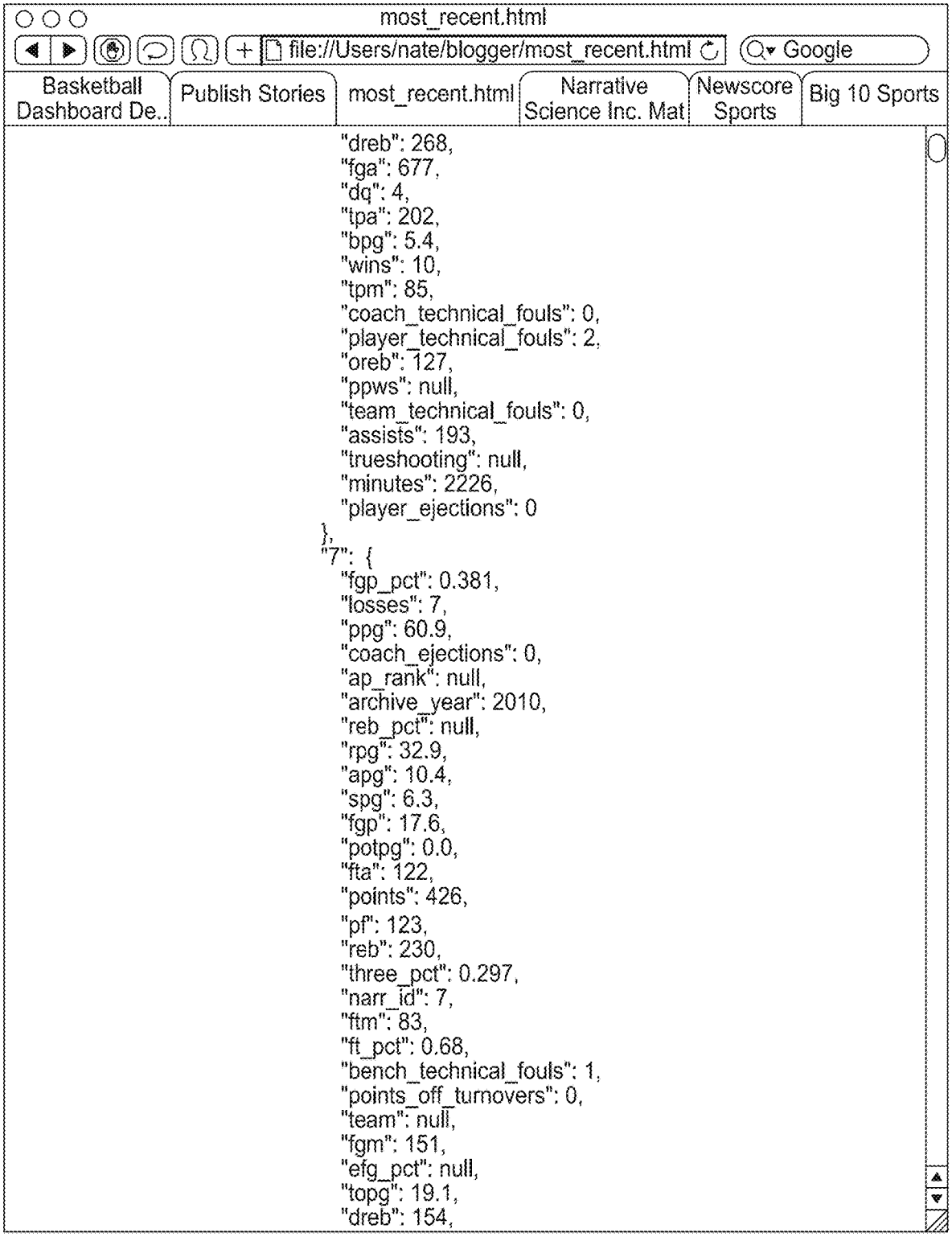
FIG. 6 illustrates an exemplary screen shot of raw data used in accordance with the process illustrated in FIG. 4.

In particular, each story spec 250 is composed of name and a set of content blocks 260, 262, 263 (which may themselves be story specs in turn comprising their own internal content blocks). Each content block 260, in turn, specifies the data and computational components necessary to generate a section of the overall narrative including constituent components: models, derived features, angles, angle selection/ranking, organization and blueprint sets. Once instantiated and combined, these sections will constitute the entire narrative being constructed. The content blocks 260, 261, 262, 263, themselves are composed, instantiated and configured by specifying the following elements, among others:

1. Models of the entities (objects, categories, and events) 270 that the narrative generated by the block will describe (such as players, teams, roles, plays, or games, etc.). These models themselves are structured objects of interest in the content vertical or domain at hand and serve to organize and structure the raw data
2. The relevant kinds of raw data (as shown in FIG. 6) about these entities (e.g., names, points scored, etc.); these may be directly specified by content blocks as well as indirectly specified through the models, angles, or blueprints included in content blocks.
3. The derived features 275 of interest about these entities (e.g., key plays and their attributes), which again may be directly specified by content blocks as well as indirectly specified through models, angles or blueprints.
4. The foci 260 of the narrative in the block, i.e., the specific objects or events that this section of the narrative will primarily be about (e.g., one or more given teams, games, players, plays, etc.).
5. In most cases, the angles 280 which interpret the raw and derived data in meaningful ways (e.g., "come from behind victory" for a team in a game, or "breakout performance" for an individual player in that game). These angles in turn specify conditions of applicability expressed in terms of properties of the raw and derived data, which determine whether the angle is a true or reasonable description or interpretation of the circumstances; through blueprint sets, specific text generation blueprints that will express these data in specific words or phrases in a manner reflecting the interpretation represented by the angle; and to other attributes such as measures of importance and compatibility constraints (or mutual exclusion) with other angles.
6. In some cases, the features or specific kinds of attributes of the entities involved which must be expressed in the story (e.g., for a pitcher, number of hits and/or runs allowed), and through these features the blueprint sets that specify how to express them in this context.
7. The organizing principle 260 of the text in the block—is it ordered chronologically? By "importance"? In a standard, fixed order? Some combination? Etc.
8. The blueprint sets 285 which are indexed by or functions of the angles or features, content blocks, (implicitly) the story type that the story spec is specifying, and the natural language in which the story is to be written (e.g., English, Spanish, etc.). The blueprint sets in turn specify the text generation blueprints, parameterizable phrasal patterns that specify the words and phrases to use in describing the angle or feature in the context of the given content block. (The parameterizations of blueprints may include elements to be expressed by other blueprint sets, i.e., phrases are recursively constructed.)

Once parsed and translated into computer-executable form, the constituent components of a content block delineated above provide the computational and data elements that, when executed, result in the instantiation of the content block.

For example, a "Baseball Game Recap" story spec consists of three content blocks. The first describes the most important events and players of the game. The second describes the pitching on both sides unless it has already been described in the first section of the narrative. The third describes other noteworthy plays and players in the game that haven't been described in the first two blocks.

The first content block in turn consists of the lede and then a description of all the other important plays and players in the game. The models specified in the first and third content blocks comprise all the plays and players, which in turn organize all the raw data about the game for example, as shown in FIG. 6. The models specified in the second content block include the pitchers (and by extension the plays in which they were involved).

The foci of the first content block are the key plays and players; the foci of the second content block are pitchers and the plays in which they were involved; the foci of the third content block are noteworthy plays and players.

The angles associated with the first content block in this example describe the overall "shape" of the game—was it a come from behind victory? a blowout?—as well as key turning points and important players. The features associated with the second content block concern specifically pitchers and their performance. The angles associated with the third content block concern what counts as a noteworthy play in general.

The conditions of applicability of the angles associated with each content block, or the features directly, determine the relevant raw and derived features that must be available or computed in order to generate the narrative for that block. Thus the derived features specified by the first content block concern identifying overall patterns and critical plays and players. Those specified by the second content block concern pitching. Those specified by the third content block concern how to pick out noteworthy plays and players in general, e.g., those that deviate from historical norms in general or recent trends of this team and its players in particular.

Finally, the organizing principles of the three content blocks vary. The angles (and associated data) in the first block are organized and sequenced by importance. This will be reflected in the order in which these angles and data are expressed in the final narrative. Those in the second content block follow a fixed organization (first the winning pitcher, then the losing pitcher). Those in the third content block are organized chronologically.

To more specifically illustrate our approach to high-level specification of the data and computational components necessary to generate a narrative, consider the following excerpt from a relatively straightforward story specification (FIG. 3, 250):
    name: main(metro:MetroArea)<Story
    request: Paragraph(new_sales($metro))
    request: Paragraph(mortgages($metro))
    request: Paragraph([ShiftToSingleFamily($metro),
      ShiftToAttached($metro),
      NoShiftComposition($metro)])

This story spec excerpt specifies a portion of the computations and data necessary to generate monthly real estate market condition reports for individual metropolitan areas. These stories have a relatively fixed structure, reflected in the simplicity of the spec.

The first line of the specification
    name: main(metro:MetroArea)<Story
defines the name of the story specification ("main") and specifies both the focus of the specification and the relevant models, in this case the single model type "MetroArea", which is also the type of the focus. It also specifies the structural type of the output determined by this specification, in this case "Story".

The next three sections of the specification, each headed by the term "request", specify three of the content blocks (FIG. 3, 260) that we have excerpted here. Each content block will result in a paragraph, and those paragraphs, in order, will constitute the narrative as a whole. This excerpt thus provides an example of a specification specifying a fixed order to the narrative. The first two content blocks refer to previously written and named content blocks, one called "new_sales" and one called "mortgages". This shows how content blocks, once authored, can be saved in libraries and easily reused.

The third content block
    request: Paragraph([ShiftToSingleFamily($metro),
      ShiftToAttached($metro),
      NoShiftComposition($metro)])
illustrates how a new (relatively simple) content block can be specified. This content block specifies three angles, "ShiftToSingleFamily", "ShiftToAttached", and "NoShiftComposition"; these angles (FIG. 3, 280), which are mutually exclusive, provide three possible interpretations of the raw and derived data, depending on whether their conditions of applicability are met by that data. As the names suggest, these three angles interpret the data as representing a shift towards single-family dwellings, a shift towards attached dwellings, or no change in the overall composition of the market in terms of dwelling type. One of these angles will be selected as the appropriate interpretation of the data (see discussion regarding FIG. 5 below), and, when the story is finally rendered in natural language, the blueprint(s) associated with the selected angle, appropriately parameterized, will be used to render the text of the paragraph.

A more complete excerpt of a more complex story specification is as follows:
    name: recap(game:Game)<Story
    request: Headline([UpsetGame($game),
      BuzzerBeater($game),
      TakeTheLeadLate($game), . . . ][0])
    request: Lede([UpsetGame($game),
      BuzzerBeater($game),
      TakeTheLeadLate($game), . . . ][0])
    request: Paragraph([UpsetGame($game),
      BuzzerBeater($game),
      TakeTheLeadLate($game),][1])
    request: Paragraph(team_paragraph($game.winner))
    request: Paragraph(team_paragraph($game.loser))
    name: team_paragraph(team:Team)<Paragraph
    request: Sentence([$team.double_double_players])
    request: Sentence([Steam.double_digit_scorers])

The story specification from which this has been excerpted, in this case named "recap", concerns models of type "Game" (basketball games), which is also the type of the focus. This model (FIG. 3, 270) is fairly complex and includes other models within it, describing, for example, the teams, players, plays, etc., involved in the game.

This excerpt specifies five of the content blocks that make up this type of story. The first content block will ultimately generate a headline; the second will generate the lede of the story, i.e., the first paragraph of the story, describing the most important point; and the rest will generate the other paragraphs in the body of the story. Each of the first three content blocks specifies a set of potential angles to apply to the facts of the game (e.g., UpsetGame, TakeTheLeadLate, etc.), and in fact the same set of angles, of which only the first three are shown. The conditions of applicability of these angles will be evaluated, and their importance determined. The headline and lede will both talk about the same angle, namely the most important applicable angle, as specified by the bracketed "[0]". The blueprint sets for whatever angle turns out to be most important will, however, be different in these two content blocks, since headlines must be written differently than lede paragraphs.

The third content block, corresponding to the second paragraph of the story, also utilizes the same angles as the headline and lede. However, this content block will select and talk about the second most important applicable angle, as specified by the bracketed "[1]".

The fourth and fifth content blocks, corresponding to the third and fourth paragraphs of the resulting story, address the strong players of the winning and losing teams respectively. They both call the same parameterizable story specification or content block "team_paragraph", but with different models specified as the focus; this illustrates the configurable nature of content blocks and more generally of the high-level components comprising them. This content block specifies two derived features, and will result in describing the performance of all players who perform well in at least two aspects of the game (e.g., rebounds, blocks, etc.) as well as all high scorers.

Note also that story specs can be organized and parameterized to develop different stories for different customers or audiences. For example, rather than talking first about the strong players on the winning team and second about those on the losing team, this story specification could be written to talk first about the strong players on the home or client team regardless of whether not that team won the game.

As described above, the narratives specified by different content blocks are organized differently. For example, the initial description of a game will focus on the most interesting and important things that happened first. Hence an "importance" metric on angles is necessary to properly determine the order in which these events (more properly, the angles characterizing these events) are expressed in the narrative. On the other hand, the content block that is included to make sure the description is complete is organized chronologically, i.e., events are described in the order in which they occurred, as long as they rise above a certain level of "noteworthiness" or importance. By explicitly specifying these organizing principles in terms of abstract attributes (such as "importance", "noteworthiness", chronology, etc.) of angles, features, and models, it is possible to abstractly specify these aspects of story specifications without requiring detailed knowledge of the content vertical in question, specifically of what constitutes "importance" or "noteworthiness" within that content vertical. (This also makes it possible to specify, e.g., an abstract "Game Recap" story specification, of which a "Baseball Game Recap" story specification is configured as an instance)

Our platform also incorporates some new approaches to "importance" as compared with our earlier system, specifically, combining the inherent importance of an angle (itself including a fixed component as well, in some cases, a function of the features on which it depends) with the amount of new factual information it conveys to come up with an overall measure of its priority.

Now, let's consider the high-level specification of an angle:
  name: MissedThrowsLoseGame($game:Game)<NormalAngle
  test: "GreaterThan($self.loser.stats.missed_free_throws, $self.margin)"
  importance: "Diff($self.loser.stats.missed_free_throws, $self.margin)"
This angle, "MissedThrowsLoseGame", is intended to capture situations in which missed free throws in a basketball game spell the difference between winning and losing. The applicability condition (FIG. 3, 280) for this angle is that the derived feature representing the total number of missed_free_throws for the losing team ($self.loser.stats.missed_free_throws) is greater than the derived feature representing the margin by which that team lost ($self.margin). The importance of this angle is a function depending on the amount by which the number of missed_free_throws exceeds the margin by which the loss occurred.

Turning now to derived features (FIG. 3, 275), consider the following feature, which simply computes whether or not the team even took a shot during the game:
  name: "took shots:Fact"
  self_type: Team
  value: "GreaterThan($self.stats.fga,0)"
This derivation applies to a Team model and returns a Fact model (essentially, a boolean truth value that can also be undefined). It simply compares the number of shots attempted ($self.stats.fga) with a threshold of zero, and returns True or False accordingly.

Here is a more complicated derived feature that computes the most efficient shooter on a basketball team:
  # Most Efficient Shooter on a Team
  name: "most efficient shooter:Player"
  self_type: Team
  value: "MaxByFeature(FilterList(Sself.players,stats.enough_shots), stats.ppws)))"

This derivation applies to a team model (and associated data), and specifies a player model. It is aimed at determining the player who got the "most bang for the buck" in terms of baskets scored as a percentage of baskets attempted. It first filters the players to identify those who have taken "enough" shots—this is aimed at eliminating players who would otherwise look good by this metric because they attempted only a small number of shots and scored them all—which is also a derived feature. It then identifies the player with the highest "points per weighted shot" (stats.ppws)—also a derived feature.

Turning now to blueprints (FIG. 3, 290) and blueprint sets (FIG. 3, 285), here is an example of a simple blueprint set including only a single blueprint:
  name: ex dividend headline(stock:Stock)<Headline
  features: [$stock]
  content:
    "$stock.short_name Stock to go Ex-Dividend Tomorrow ($stock.symbol)"
This blueprint set focuses on expressing a stock feature inside a Headline content block. It includes only a single parameterized blueprint, with the parameters being the short name of the stock in question and its symbol.

Here is a slightly more complex blueprint set comprising several blueprints:
  name: big benchproduction(team:Team)<Sentence
  angles: [BigBenchProduction($team)]
  content:
    "Substitutes chip in $team.bench_split.ppg points per game for $team."
    "$team{'s} reserves give the team a big lift providing $team.bench_split.ppg points per game."
    "$team{'s} bench helps out a lot on the court scoring $team.bench_split.ppg points per game."
This blueprint set includes three parameterized blueprints for expressing the angle "BigBenchProduction", which applies when non-starters on the team contribute a lot of points to its scoring. The parameters are the team itself, and each blueprint uses the derived feature $team.bench_split.ppg, which indicates the points per game achieved by non-starting players. This blueprint set is used inside the body of a basketball preview story; in order to provide some variation of expression both within and between stories, the system will vary the specific blueprint used among the three contained in the blueprint set.

Blueprints are the parameterized phrases used to finally express an angle and/or feature in natural language. Internally, each blueprint is a list of Tokens 290. Normal words are stored as WordTokens, and are generated directly when the content is generated. VariableTokens are used to incorporate specific features of the current situation, as in the blueprint "$home.best_player scored $home.best_players.points points." Complex models (such as Player) specify a display_feature (such as the player's name) to be used when the model is voiced. Different kinds of features are presented in different ways. For instance, a feature that is in dollars is displayed preceded by a dollar sign, and dates and times are displayed in human-readable formats. Again, this approach allows editors to write concise, readable blueprints without worrying about the final details of ensuring that currencies etc. are displayed correctly.

Tokens may also be PhraseBlock tokens. PhraseBlocks are brief snippets of text that are useful for displaying quantitative information in a human-readable way. For instance, a derived feature may be that Tom Jones has scored 27.3578% of Northwestern's points in a game. PhraseBlocks are general-purpose transformations that result in generating this derived feature using the phrase "just over a quarter."

Finally, Tokens may also be PunctuationTokens, which make it possible for editors to conditionally express grammatical constructions involving punctuation. For example, the possessive ({'s}) will be voiced as "'s" if the preceding word does not end in an s, or as just "'" if the word does end in an "s". Similarly, lists of unknown lengths can use the comma punctuation token {,} to ensure that commas are inserted correctly between elements of the list. If there is only one element, the {,} is simply removed. If there are two elements, the {,} is converted to an "and", and if there are more than two, commas and an "and" are inserted correctly.

Blueprint sets (FIG. 3, 285) and their use provide a good example of the modular nature of our approach to specification of the computational and data elements involved in generating a narrative, and its advantages. Blueprint sets are functions of (and connected to), angles (or features) and content blocks. The development of a modular, standard and uniform structure for this functional relationship facilitates, for example, adapting the narrative generation system to a different natural language. To write a story in Spanish, rather than English, all that is required is to swap out the English-language blueprint sets, and replace them with corresponding Spanish-language blueprint sets. Nothing else must be changed to make this adaptation.

Similarly, because blueprint sets, angles (and/or features), and content blocks are all specified in this modular fashion, the fact that how an angle should be expressed in language varies depending on the nature of the narrative and the angle's role within that narrative can now be accommodated quite easily. These functional dependencies are captured by the notion of content block; different narrative types consist of different content blocks and the role of an angle in a narrative is specified by the role of the content block in which it is contained. As a result, a given angle need not be re-written as a set of very similar but distinct angles in order to generate different language in different contexts. Instead, the very same angle can be reused; different blueprint sets come into play for that angle in different contexts simply because blueprint sets are determined by both angles and content blocks. For instance, the identical "ComeFromBehind" angle can be used for describing a just-completed game in the context of a game summary or recap, or for describing a team's performance in their most recent game in the context of a preview of their upcoming game; but the ways in which the angle will be expressed in natural language in these two types of stories will be different because different blueprint sets will be used.

In sum, by elevating and abstracting the computational and data components involved in generating a story in terms of the standard and uniform structures described above—by having explicit story specifications configured by combining content blocks, which in turn are explicitly configured as combinations of models, raw data, derived features, angles, foci, organizing principles, and blueprint sets, where these constituent components themselves are expressed as explicit and abstract structures—the process of adapting the system to a given content vertical, story type, etc., becomes much more one of selecting and configuring these components. And even in those cases where new components must be developed, the existence of these standard and uniform structures makes that a far more guided, constrained, and hence simpler and quicker task.

C. Architecture/Platform for Utilizing High-Level Specifications to Generate Narratives The process by which the appropriate data and computational components specified in terms of high-level, modular, standard and uniform structures as described above serve to produce the final narrative is fundamentally the same as that described in initial patent applications. Specifically, as depicted in FIG. 2 the data and computational components specified by a story specification, applied to a given Data Model 200, determine the computational steps that will be performed in order to generate a language-independent outline expressing what will be conveyed in the narrative expressing that data set, and then ultimately how that outline will be rendered in a natural language such as English. As outlined in the introduction, these steps include inputting of raw features 200; computation of derived features 202; determination of applicable angles 204; ranking, selection, filtering and ordering of these angles 206; and finally rendering of the resulting narrative outline in natural language 216. The main difference with the improved system is that, since the components that describe how these steps are to be carried out are no longer expressed as code in a general purpose programming language, they are not directly executable by a computer. Thus, it is necessary to design and develop a software platform capable of utilizing the high-level and relatively abstract specifications of the necessary computational and data components—story specifications—as described in the last section, in order to generate a narrative.

Figure 4:
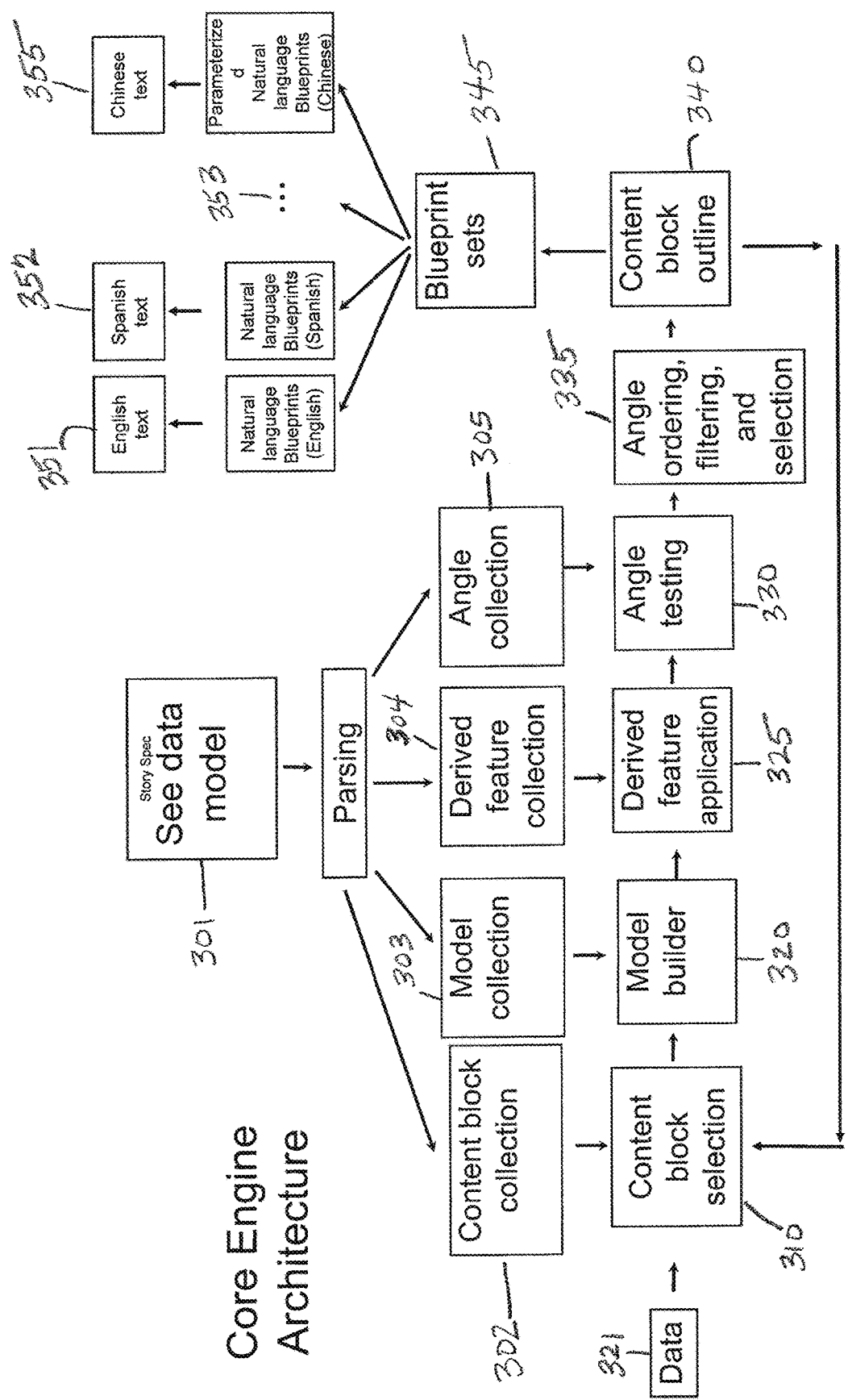
FIG. 4 illustrates in flow chart form an exemplary system which functions to automatically create a narrative story by an improved process over the process illustrated in FIG. 2.

A totally domain-independent software platform provides a general-purpose narrative generation engine as depicted in FIG. 4. The platform does not need to be modified to generate content in disparate content verticals, story types, etc. Only the high-level component specifications provided to the system—the story specification and its constituent structures—must be changed in order to adapt the system to generate narratives for different content verticals, story types, etc.

Some of the useful structural properties of story specifications, such as their hierarchical nature, have also led to modifications to system and method for narrative generation described in U.S. patent application Ser. Nos. 12/779,636; 12/779,668 and 12/779,683, and these are reflected in the improved system as well. In particular, the non-linguistic narrative outline that results from the process is an instantiated version of the story specification and the content blocks it comprises and directly reflects its structure; and the process by which the outline is constructed consists of applying the steps described above to each content block in the specification.

This section describes the architecture of our software platform or narrative generation engine as depicted in FIG. 4. At a high level, the engine performs the following key functionalities in order to generate a narrative:

1. Transforms the high-level descriptions of components contained in story specifications into executable machine code.
2. Drives the generation process from the initial story specification 301 to the final blueprint selection 345. This entails executing the computations as determined by the specification 301, including, for each content block 302 in the specification: selecting a model 303 computing derived features 304; collecting and determining applicable angles 305; ranking, selecting and ordering these angles 330; and then (after an outline of the story has been developed) selecting and parameterizing appropriate blueprints 345 to express that outline in natural language.
3. Applies appropriate domain-independent logic. To take a very straightforward example, the engine knows to capitalize the first word of a sentence, regardless of the domain or vertical; hence it isn't necessary to specify this explicitly in any blueprints.

4. Supports tools that editorial staff can use to facilitate story specification component creation and debugging (discussed in the next section).

Specifically, the engine performs the following steps to author a narrative:

1. The system parses the higher-level editorial components expressed in the story specification 301, and uses these to guide the construction of genuine programmatic data structures, expressed in a lower-level, general-purpose programming language. For instance, an editor may declare that there is a Model 303 called BaseballPlayer, and that each BaseballPlayer has a First and Last Name. The engine parses that description and creates a corresponding programmatic structure representing a BaseballPlayer Model 320. This model 320 is capable of interacting with the rest of the system, and supports obvious and necessary functionality such as accessing features of the model 320 and providing raw data 321 used for testing angles. The specific parsing logic and the data and computational structures created will vary depending on the type of component being parsed. Parsing the definition of a derived feature 325 is different than parsing a model 320, which are both distinct from parsing a content block 310. Editors never need to interact with these internal programmatic data structures directly; their interaction with the engine consists solely in specifying and configuring the various high-level components 302, 303, 304 and 305.

2. Once the components have been parsed into executable programmatic units, given fully or partially instantiated models 320 with the necessary raw data 321, derived features 325 are calculated and angles are tested 330 for applicability. The engine controls this process, and relies both on the specified component definitions contained in the story specification 301 and its own computational structures to perform these calculations and tests.

3. The engine then uses the configured models 320, derived features 325, angles 330, organizing principles, and blueprint sets 345 specified by the content blocks 310 to instantiate those content blocks and create the final content. This is a recursive process beginning with the initial story specification 301 and continuing until all computational elements associated with each content block 310 have been executed, an outline has been formed for each block 340, and blueprints 345 have been selected and parameterized.

An embodiment of the architecture of this platform, as described above is depicted in FIG. 4. This architecture diagram shows that the platform takes high-level specifications of configurable components (content blocks 302, models 303, derived features 304, angles 305 etc.) as input, parses it into its constituent components, and then, using libraries that specify how these components are expressed in terms of (parameterized) code in a general purpose programming language, transforms these specifications 250 (FIG. 3) into executable code. The platform then carries out the specified computations and constructs the specified data elements by executing this resulting code for each content block 310 in turn. In this way, the story specification and the actual input data 321 determine the exact nature of the output narrative.

The architecture diagram (FIG. 4) also indicates how this execution process proceeds. First, the system selects the next content block 310 to be generated from the story specification 301. Next, it builds the models 320 needed to generate this content block 310; computes the necessary derived features 325; tests the applicability conditions for any associated angles 330; and then ranks, orders, and filters the applicable angles 335. The result is an instantiated content block outline 340, i.e., a language-independent representation of the angles and features to be expressed in the content block 310, and the order in which they are to be expressed. The set of all the resulting instantiated content block outlines 340 comprises the outline expressing the content of the entire narrative in a language independent way. Each content block is linked to one or more blueprint sets 345, each containing parameterizable blueprints to express the angles and/or features determined within that content block in natural language, for example English 351, Spanish 352, other languages 353 or Chinese 355, etc. When selected and parameterized, these result in generating the actual text of the narrative in the desired language.

Because content blocks 340 may be story specifications 315, and/or may contain content blocks 310 within them, in some instances the entire process as described above will be recursively invoked.

A key aspect of the problem, addressed in our original patent applications, is avoiding repetition or repetitiveness both within and between narratives. As part of the platform described above, we've also developed some significantly better methods for handling different kinds of repetitiveness (which may be purely textual or may be about how to handle multiple mentions, all necessary to convey the story, of the same information).

For instance, to avoid repetitive references to a particular entity (e.g., constantly referring to the "Northwestern Wildcats"), the system is able to intelligently choose between different ways of referring to the same entity. On the first mention, for example, the system may say "Northwestern Wildcats," and on later mentions it will use either "Northwestern" or "the Wildcats."

Similarly, the system will vary which blueprint it uses to express a given angle or feature. A player from team A may have "sunk eight baskets" while a player from team B "made eight shots." Such variation can apply at multiple levels. At a micro level, editors can specify that "baskets" and "shots" are synonymous in the basketball vertical, and the system will vary the text it produces automatically by varying its choice of those words. At a more macro level, editors can also write entirely different blueprints to present aspects of the "Come From Behind Victory" angle. The system will vary which it chooses, and can then introduce further variability within the chosen angle by using either "basket" or "shot."

Finally, the system can reduce repetition by choosing which blueprints to present based on the words in the blueprint and the words used previously in the story. For instance, even across entirely different blueprints, expressing entirely different angles, the system can recognize that it has used the word "stupendous" in the beginning of a story, and so should favor blueprints that don't include the word "stupendous" later in the story.

By explicitly specifying structures that reflect these linguistic aspects of content generation (such as different kinds of repetition), we can include proper support for them in our underlying platform; and by providing this support automatically, editors are freed up from worrying about such low-level details and don't require programmer support to manage them properly.

We have also developed an integrated and dynamic model of interestingness for features—either derived or present in the original data—and angles that incorporates both domain-specific rules and general rules of story-telling. Domain-specific rules include logic such as, "The more rebounds a player has in a game, the more important interesting his number of rebounds feature is." The general rules encode logic such as, "A feature is substantially less interesting the second time you say it." Combining these two values gives us an interestingness metric for each feature that changes as the story is being written. Balanced against the goal of avoiding repetitive language, this metric guides the system in its choice of blueprints. An "Heroic Performance" angle, for instance, may have two possible associated blueprints that each present the heroic performer's offensive stats for the game, one that includes the number of rebounds the player made and one that does not. If the player has a sufficiently interesting number of rebounds—as determined by the rules described above, i.e., on the actual number of rebounds the player had and on how many times the player's rebounds have already been mentioned in this story—the blueprint that includes rebounds will be selected; otherwise the alternative will be selected.

The use of a high-level, configurable narrative specification as described here also makes it possible to create and apply more general-story telling rules, and even to control their use editorially. An editor may choose to increase the interestingness of features that have already been generated by other angles and models in order to produce parallelism in the final text. For example, if the story discusses three effective basketball players, and the first two have interesting points and rebounds, but the third has zero rebounds, the system may choose to present points and rebounds for all three to highlight the comparison for readers. Alternately, an editor may choose to increase the interestingness of features that have not already been generated by other angles or models in order to increase the diversity of the final text.

Figure 5:
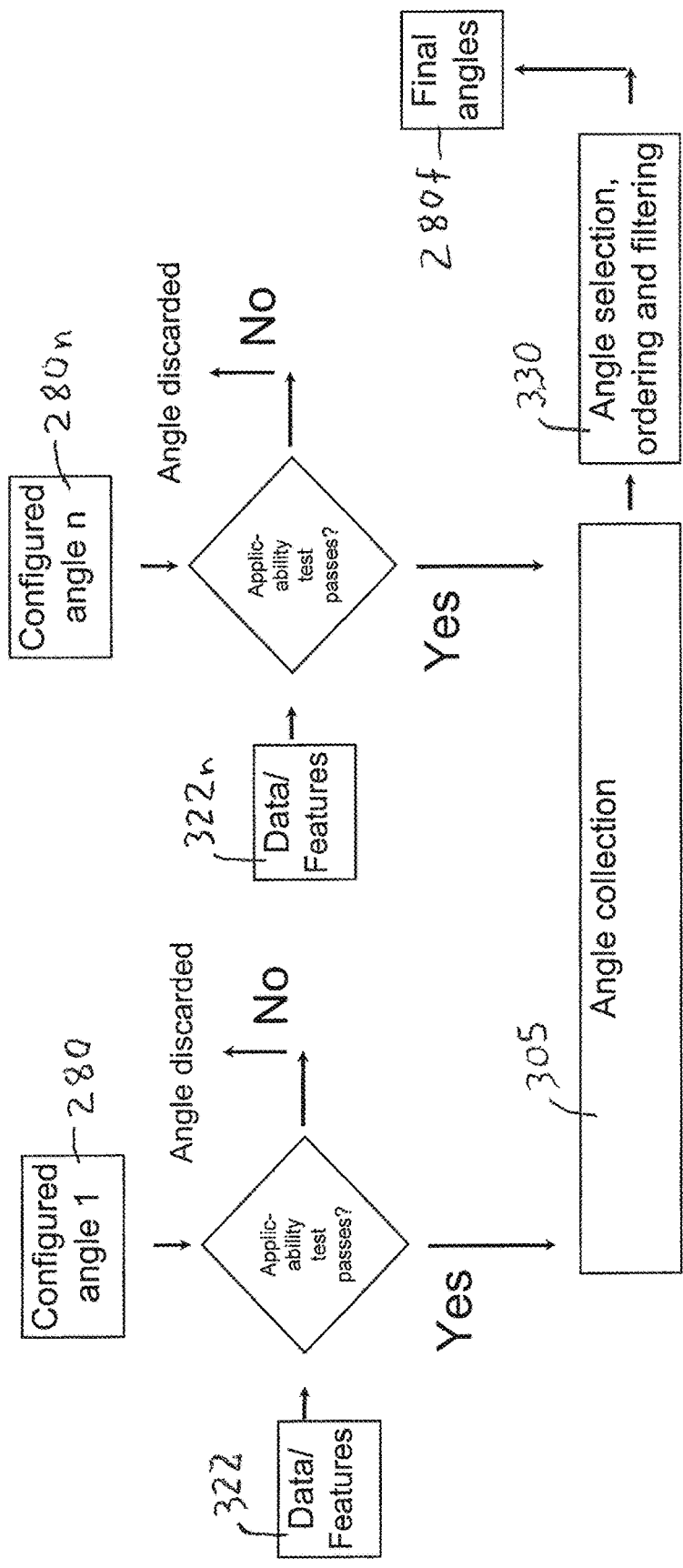
FIG. 5 illustrates an exemplary angle flow chart used in accordance with the process illustrated in FIG. 4.

FIG. 5 depicts an embodiment of the process of testing the applicability of configured angles. The process of applying angles is a sub-component of the overall narrative engine architecture depicted in FIG. 4 and utilizes the constituent components specified by the Data Model depicted in FIG. 3. As shown in FIG. 5, configured angle one 280 is compared with data and features 322 to see if the data and features 322 meet the applicability conditions of the angle 280. If there is no applicability the angle is discarded. If there is applicability the angle 280 is collected 305. This process is repeated for all configured angles "n" 280n, comparing with data and features 322n until all applicable angles 280-280n are collected in the angle collection memory 305. Thereafter, angle testing 330 is undertaken for all angles 280-280n by selection, ordering and filtering in order to provide final angles 280f These final angles 280f are then connected with the content blocks 310 to prepare a content block outline 340, as depicted in FIG. 4.

D. Tools Enabling Non-Programmers to Develop Narrative Specifications

A key advantage of the approach outlined above is that the definition and use of high-level, standard and uniform structures for specifying the computational and data components necessary to generate a narrative, implicitly guides and specifies a process for developing such components, and hence for adapting the system to generate a given story type for a given content vertical. This process involves designing an appropriate story specification, i.e., specifying the content blocks that should constitute that specification, which in turn entails specifying the relevant models, angles, derived features, organizing principles, and blueprint sets and blueprints for each of these constituent content blocks. This is a far more constrained and guided process than programming per se, one that in many cases can be accomplished by taking existing story specifications and modifying them slightly.

Because the process of developing these high-level components is constrained and guided by the standard and uniform nature of those components, it is possible to develop tools that embody and support that process. Three classes of tools have been developed to date to support the editorial process:

Configuration tools. These tools assist the editors in initially configuring the components of a story specification—content blocks, angles, etc.—before any content has actually been generated.

Editorial assessment tools. These tools assist the editors in understanding the process of how a particular piece of narrative content was generated, i.e., how the story specification they developed led to a particular outcome. This supports iterative development of story specifications.

Platform debugging tools. These tools allow non-technical editors to easily present questions or bugs in the platform itself to more technical programmers to receive an explanation or fix.

Importantly, all three classes of tools are presented at a much higher level than traditional programming development and debugging tools. Together, they enable non-technical editors to quickly and reliably configure, test, and refine the components that will drive the content creation process.

The simplest configuration tool we have developed is a project skeleton that is used as the starting point for new projects. (A project is the development of a new story type in a new content vertical, such as, e.g., "College basketball game recaps.") Skeleton components support the creation of a very basic, default narrative. Although the actual generated content is too simple to be of use in any real project, starting from a basic, working framework is useful when beginning such a project. The editorial and creative process then becomes an iterative and additive one, copying and modifying functional components into an already operational (if not yet adequate) story specification instead of generating and assembling new components wholly from scratch.

Currently, the editorial components, such as models and content blocks, are configured using standard text files. As a result, although the components are configured in terms of high-level, standard and uniform structures, they are still vulnerable to typos, misremembered feature names, and other human errors on the part of the editor. (For instance, an editor could declare something to be a "Moedl" instead of "Model", or refer to a feature named "points scored" instead of the correct "points_made".) Our configuration tools are able to quickly recognize and notify the editors of these kinds of common mistakes so that they can be easily fixed.

Figure 3:
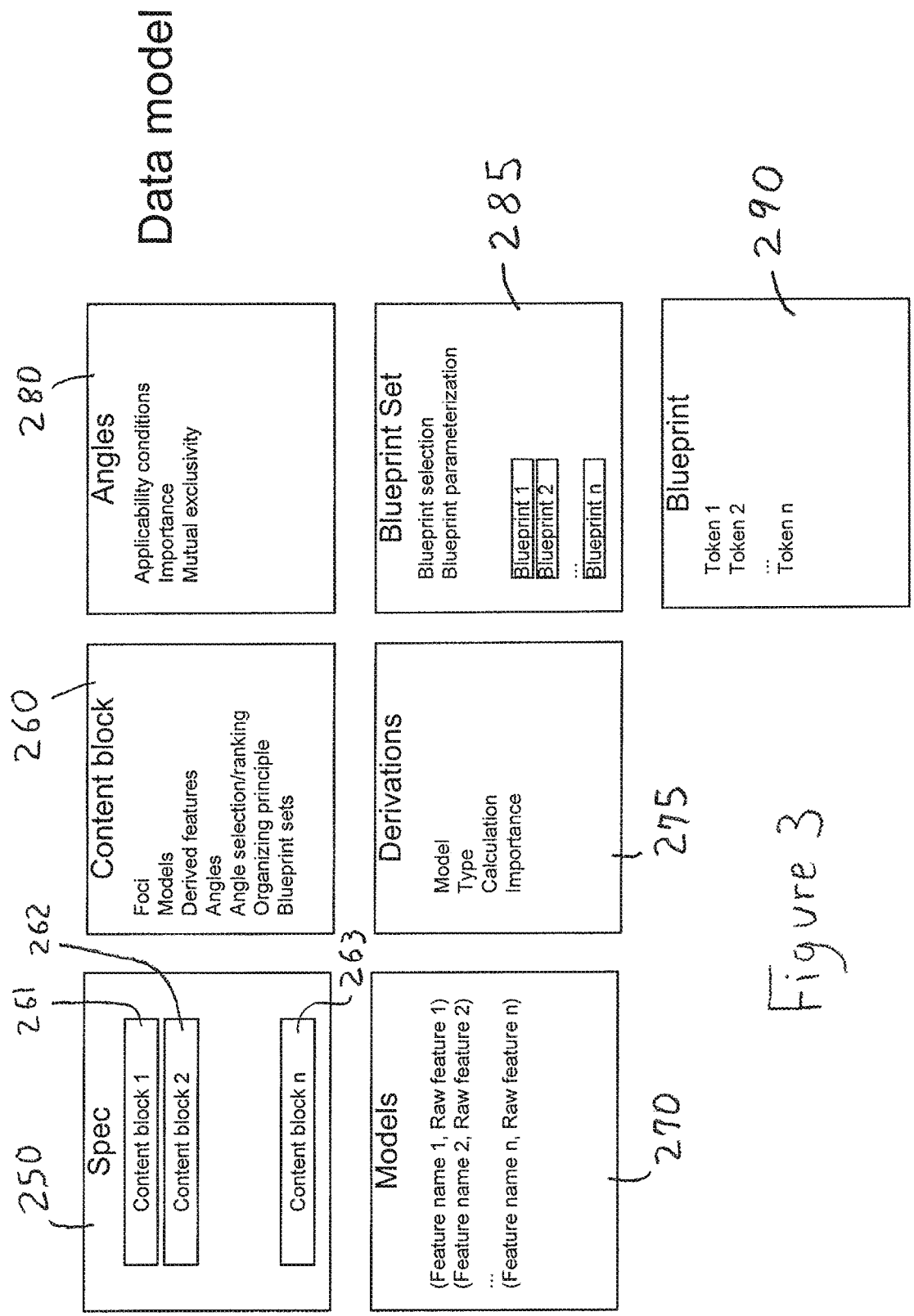
FIG. 3 illustrates an exemplary data model used in accordance with the process illustrated in FIG. 4.
Figure 7:
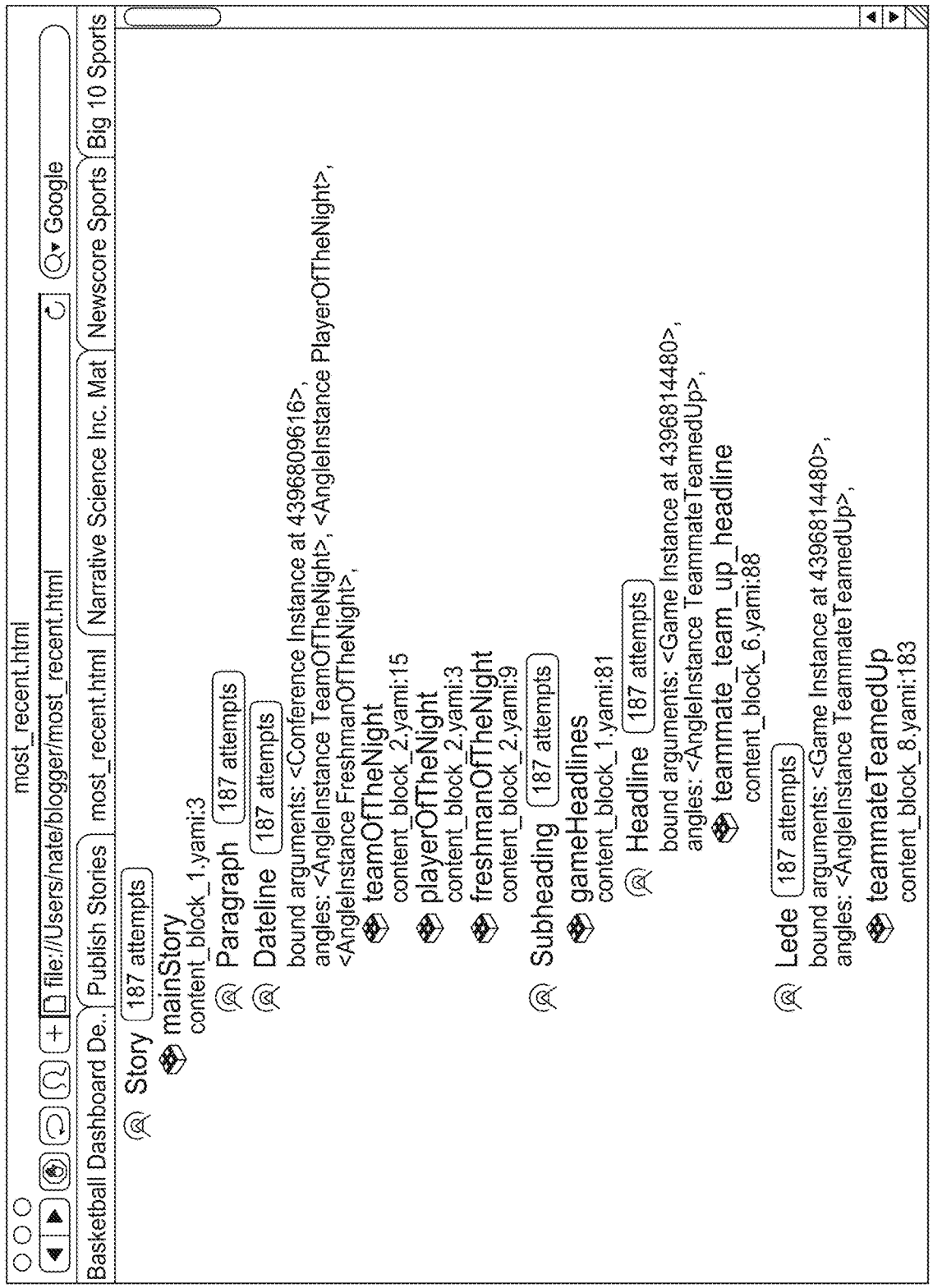
FIG. 7 illustrates an exemplary screen shot of notated steps performed by the system in the process of instantiating a story specification in accordance with the process illustrated in FIG. 4.
Figure 10:
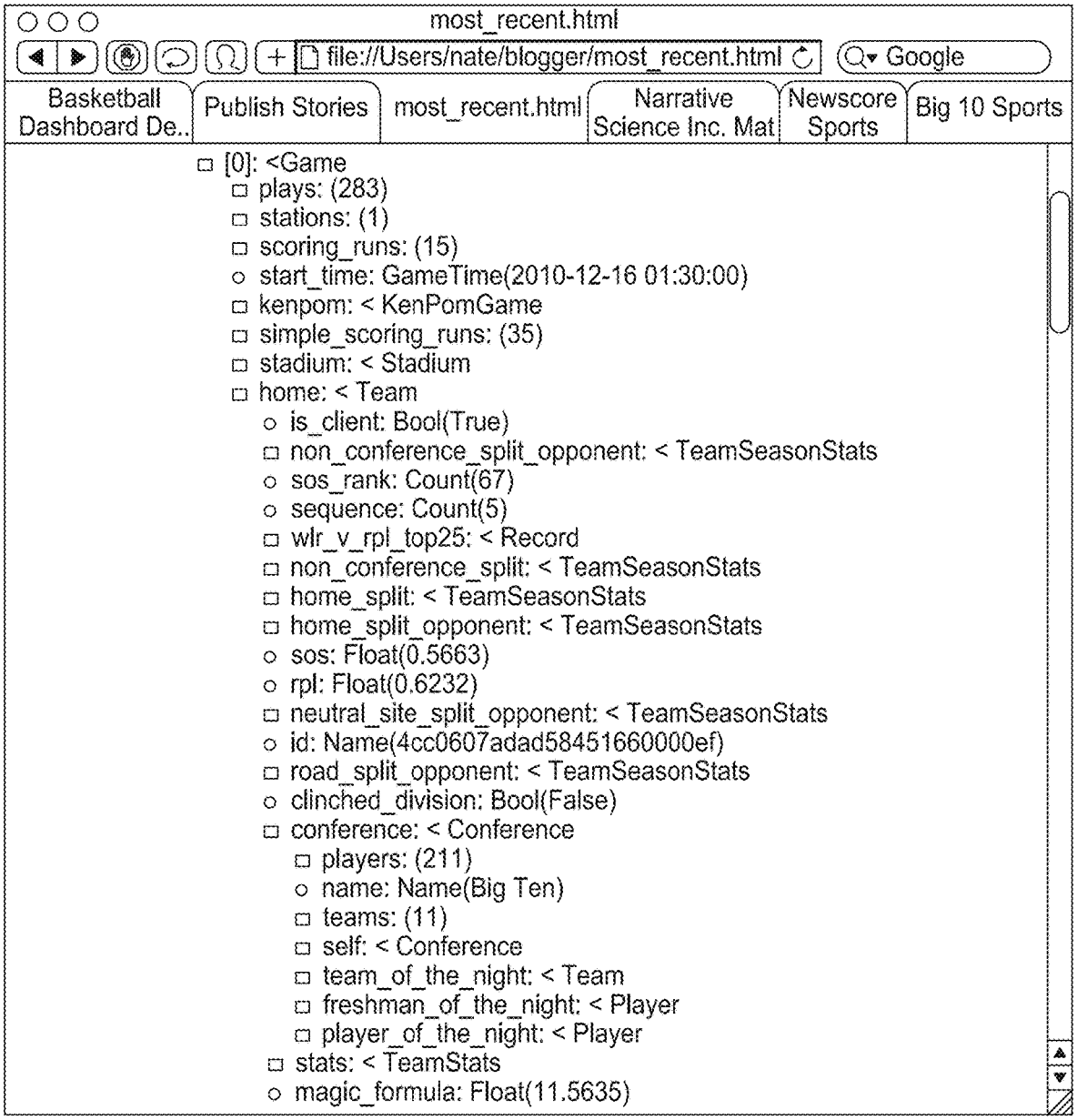
FIG. 10 illustrates an exemplary screen shot of computational models of domain-specific entities used in accordance with the process illustrated in FIG. 4.

The principle editorial assessment tool is called the "hlogger" (an abbreviation of "HTML logger".) After a particular piece of content has been generated, the resulting hlogger file (viewable in any web browser) provides a detailed, higher level explanation of exactly how and why that piece of content was created. This is presented in an editorially focused, non-technical manner. It does not include technical information such as the amount of computer memory consumed, or how many programmatic objects were created. Rather, it provides a detailed view into only those aspects of the content creation process specifically relevant to narrative generation that would be of interest to editors in debugging and refining component specifications. These include:

1. The original raw data used to create the story as shown in FIG. 6.
2. The models created from that original raw data as shown in FIG. 10
3. The evaluation of each derived feature, including its input and output as shown in FIG. 9
4. The testing of each angle's applicability conditions and the their results as shown in FIG. 8
5. The filling out of the story specification and content blocks. This includes information such as which angles and blueprint sets were considered, and why they were or were not chosen to fill different roles in the story as shown in FIG. 7.
6. The final output of the story.

These pieces of information are presented in two different ways. The first is simply as a list; for instance as shown in FIG. 8, all the angles considered in a given content block during the generation of the narrative are presented under the "Angle Name" heading and can be browsed linearly. The second mode of information presentation model is organized by the final output of the system. Editors can choose a sentence in the final output, and quickly see the blueprint that generated the sentence, as well as the content blocks, angles, derived features, and blueprint sets that played a role in the system's decision to choose that particular blueprint and its parameterizations.

The editorial assessment tool makes debugging the final content a much simpler task, thus facilitating iterative development of components specifications. Instead of trying to reconstruct the decisions and calculations performed by the engine in a general-purpose way, the editor is able to quickly determine the computations and data underlying every word in the final content, and if necessary modify the configured components as appropriate. For instance, an editor may be surprised to see the sentence "John Jenkins was a star performer for the Wildcats" in a story. The editor can easily select that sentence, and see that it was produced because the engine invoked a "StarPerformer" angle, the applicability conditions of which, for example, evaluate as true when one player scores 15% of the team's total points. If the editor then makes the editorial decision that this threshold is set too low, he or she can easily alter the threshold, resulting in an improved narrative not only in this case, but in general. Moreover alternate settings for such thresholds can be specified and saved as a group representing a particular set of editorial decisions. Thus the system can be easily adapted to represent different kinds of editorial judgment depending on the customer or audience.

In sum, because the operation and implementation of the engine itself and of the computational components it constructs from the story specification are relatively complex and difficult for non-technical editors to understand and debug, the hlogger was developed to expose their workings in a way that is useful to and actionable by non-programmers. And because the engine uses a consistent internal representation of the configurable components across different content verticals and narrative types, the hlogger file is usable across domains.

Finally, we have developed tools to enable editors and software developers to work together isolating and reproducing bugs discovered in the engine itself. A developer may not have the same components defined as does the editor, or the data that was used in the original story may no longer be available. If, for example, the winning record for a given team has been updated since the story was created, the programmer may no longer be able to regenerate the original story that displayed a bug. These factors, among others, make reproducing a specific piece of content that displays some bug or inconsistency very difficult.

To sidestep this problem, we have a developed a tool to create a "horn" file in parallel with every piece of content. The horn file is guaranteed to encompass the entire environment needed to create that exact piece of content, including such information as all of configured and instantiated components from the story specification, a copy of the original data used, and the state of the pseudo-random number generator used to promote additional variation when necessary. Using this relatively small horn file, technically skilled programmers can reliably reproduce bugs editors find in the engine itself.

Finally, we have embedded some new approaches to improving our stories over time into the platform itself. Our platform provides warnings and requests for new content, particularly regarding blueprints, such as, for example, "I'm saying this a lot, give me more ways to say it," "I am displaying the scores for these three players, it'd be great if I had a way to combine them," etc.

E. Abstraction, Compositionality, and Reuse

The constituent components of the story specification, are as abstract and modular as possible to enable their use across multiple content verticals and story types to the greatest extent possible. Components that have been specified in this way can be more easily function together in combination, thus facilitating their reuse. For example, the appropriate angles and their applicability conditions to be used in generating a narrative generally depend jointly upon the nature of the content vertical, the type of narrative being generated, and the foci of this narrative. Thus, for example, even if the vertical and the type of story remain the same, if the focus changes then the applicability conditions of the relevant angles will necessarily refer to different features. For example, even staying within the domain of basketball, and the narrative type "top 10 ranking," the raw and derived features that are used to rate players in order to place them in such a ranking are different from those used to rate teams. And of course the features required to rate basketball players are different from those required to rate, e.g., baseball players.

On the other hand, the angles useful in generating a top 10 ranking narrative of this sort—for example, "jumping (or dropping) sharply in the rankings," "holding steady," etc.— seem applicable across a wide spectrum of specific content verticals: Teams can jump or drop sharply, or hold steady, in rankings in almost any team sport, as can players in those sports, or, for that matter, businesses in a ranking based on financial or market metrics. However, the applicability conditions for these angles must, ultimately, refer to the appropriate raw and derived features used to rate the entities being ranked in the content vertical under consideration. For baseball players, these features might include some combination of runs, hits, rbis, etc.; for basketball players, it would be a combination of points, rebounds, etc. If the applicability conditions for these angles are expressed directly in terms of the specific raw and derived features relevant to the given entities in the given content verticals, then distinct angles characterizing these kinds of situations must be specified for each distinct content vertical and entity in which one wishes to generate a "top 10 ranking" story. In other words, some duplication of effort will be necessary, involving the replication of more or less the same angles, but with different applicability conditions expressed in terms of different derived features.

If these angles are placed in an abstraction hierarchy, then the common elements among these related angles—e.g., the angles with which they are mutually exclusive, their relative importance, etc.—can be expressed just once, and shared across all of the more specific instances. In addition, if the angles and their applicability conditions, as well as the raw and derived features and their derivations, are specified with the appropriate level of abstraction and modularity, they can be combined relatively easily to produce the appropriate result. For example, the particular derived features necessary to determine the applicability conditions appropriate to the focus and content vertical can be specified as parameters to the abstract angles in order to easily create specific versions.

Moreover, these features themselves can be placed in abstraction hierarchies, so that the applicability conditions of abstract angles can be expressed in terms of abstract features. We have developed explicit notions of abstraction and modularity for derived features that enable us to more quickly apply the system to new situations by making it possible to utilize these features more freely in combination with angles, content blocks, etc.

For example, every type of player in any sporting event we handle automatically has a rating metric attached to it, since the general category of Player has such an attribute. The details of how such a metric will be computed varies from content vertical to content vertical and even within verticals for different types (roles) of players. Moreover, a "game recap" story may utilize one rating metric for players, but this will not necessarily be the same as metrics that apply over a set of games, a season, or a career. Yet all of these rating metrics would be the relevant measures for "Top 10 Ranking" stories about players of a particular type in a particular sport, over different time frames. And within a given content vertical, a "Top 10 Ranking" story requires rating metrics whatever focal entities are being ranked—whether players, teams, games, plays, etc.—but again, as mentioned earlier, these measures are obviously different from each other.

However, all these raw and derived features can, like angles, be placed in an abstraction hierarchy and categorized as "rating metrics." This makes it possible, in some cases, to specify the story types and angles that utilize such features in terms of this general feature category rather than in terms of particular instances of metrics in that category. That is, rather than the applicability conditions of, say, the "dropping sharply in the rankings" angle referring to the specific rating metric for a given entity in a given content vertical in order to determine that entity's ranking in the story, those conditions can refer to the abstract feature "rating metric". That in turn makes it possible to adapt a "Top 10 Ranking" story specification and its associated angles to new content verticals in large part simply by configuring them with the appropriate focal entity and associated rating metric.

The relations among the abstract categories of derived features that have been specified can in many cases also be used to generate particular instances of derived features automatically from instances of the related abstract features. For example, a baseline definition of a player's "rating metric" in a sport might be that it is the sum of his or her performance on "internal" metrics (e.g., how long he holds possession of the ball, yards rushing, etc.) as compared with the average along each of those dimensions among some comparison set. Given such a specification of the relationship between the abstract feature "internal measures of performance" and the abstract feature "rating metrics", a specific "rating metric" for players in a given sport can automatically be generated simply by specifying which attributes of the raw data constitute such "internal measures of performance", namely, as the sum of the ratios of the player's internal measures to the average of those measures for all players. While this metric might later be refined in light of specific expertise in the given content vertical, it would certainly work fine as a first cut approach and might even prove durable.

To take a slightly more complex example, we can explicitly construct abstract categories of derived features that express the distinction between "internal" metrics of performance (e.g., in football, yards rushing, or time in possession of the ball; in business, market share or revenue; etc.) and "external" metrics (e.g., points scored, winning vs. losing; profit, or market cap; etc.). This makes it possible to specify abstract angles that depend on some relationship among these categories of metrics in terms of these abstract derived features, rather than in terms of features applicable only to a single content vertical. This again makes it possible to place such angles within an explicit abstraction hierarchy, greatly facilitating portability across content verticals and story types.

For example, in characterizing and interpreting football games, one useful angle might be that a team with a lot of yards rushing or completed passes, but not many points scored, has been "unable to capitalize on its opportunities" in the game. And indeed it is possible to specify the conditions of applicability of such an angle for football games (and teams) directly in terms of these particular features (raw and derived) of football. But more generally, it is clear that this angle is in fact an instance of a more general angle that is applicable to any entity in any content vertical to which some notion of performance applies. If any such entity is doing well according to "internal" performance metrics but not according to "external" metrics, then it can be usefully characterized as "failing to capitalize on opportunities". For example, a baseball team with a lot of hits, or more generally a lot of men on base, but not a lot of runs, could usefully be characterized as "unable to capitalize on its opportunities". Similarly, in a completely different content vertical, a company that is driving down costs quickly compared with its competitors, or that is bringing new products to market at a good rate, but that is nevertheless lagging these competitors in terms of is profitability or stock price, might again be usefully characterized as "unable to capitalize on its opportunities".

The point here is that the specification of the abstract derived features "internal performance measures" vs. "external performance measures" makes it possible to specify the abstract angle "unable to capitalize on opportunities", with applicability conditions specified in terms of these abstract derived features; and all the specific variants of that angle mentioned above in the context of particular context verticals are specific instances of this abstract angle. This again makes it possible to adapt this abstract angle to a specific content vertical in large part simply by specifying the particular instances of the two abstract categories of derived features, "internal" vs. "external" measures of performance, that apply in that content vertical.

Finally, in some cases we want to compose two story specifications, for example by "nesting" one inside of the other, in order to produce a more complex story. For example, we may want to embed a short "Game Recap" story inside each entry of a "Top 10 Ranking" story, in which, for each team we are ranking, we describe how it did in its last game. In order for this to work smoothly and result in the most coherent narrative possible, in general we need to connect the outcome expressed in each individual entry recap with how the ranking of that team has changed over the previous (say) week. For example, Team A may have gone down in the rankings, and the entry will say that; on the other hand, the recap embedded in that entry may say that Team A won (or lost) its last game. If the team lost, the narrative will be coherent automatically—Team A lost its last game, and went down in the rankings. But if it won, further explanation is necessary, because the story now is Team A won its last game, and went down in the rankings. To make this more coherent, some explanatory connection must be established, for example, that it was expected to win because the team over which it was victorious was much weaker, so that this win wasn't of consequence in determining its ranking for the week.

To be as compositional as possible, this explanation must be provided without requiring that the angles involved in writing "Ranking" stories know anything about the specifics of angles involved in writing "Game Recaps" in a given vertical. We can do this by specifying abstract angles characterizing "expected positive events" and "unexpected positive events" of which the "expected victory over a weaker opponent" and "unexpected victory over a stronger opponent" angles in football—or any other content verticals involving competition—are instances. (Similarly there are "unexpected defeat by a weaker opponent" and "expected defeat by a stronger opponent" angles along with their generalizations.) The angles specified by the "Ranking" story specification can then refer to these abstract angles rather than the specific instances within any content vertical; for example, they do not need to know the name or any internal details of the "expected victory over a weaker opponent" angle in the football vertical.

In the best case, these generalized angles will have equally general blueprint sets and blueprints attached to them, which can be used to express them in language whatever the particular context or content vertical. In many cases, however, to achieve the best possible fluency it is still preferable to create vertical-specific blueprints in order to present them. For example, an editor must still create a blueprint to present the information that "Team X slipped in the rankings because even though it beat Team Y, the win margin was not as high as expected" even though the abstract angle "expected victory over a weaker opponent" is utilized. This is strictly an editorial task, however, and requires no programmer support, which is a marked innovation over previous systems.

While various concepts have been described in detail, it will be appreciated by those skilled in the art that various modifications and alternatives to those concepts could be developed in light of the overall teachings of the disclosure. For example, while the described system allows a story constructor to define the parameters that are to be used to customize a narrative story for a given audience, it will be appreciated that the focus of the narrative story can be automatically determined as a function of the derived features that result from the domain input event data. Further, while various aspects of this invention have been described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed herein are meant to be illustrative only and not limiting as to the scope of the invention which is to be given the full breadth of the appended claims and any equivalents thereof

What is claimed is:

1. A method for automatically generating a narrative story about a data set using a narrative generation platform that is horizontally scalable to a plurality of different story types or content verticals, the data set comprising structured data in a plurality of fields and/or categories that describe one or more events, situations, entities, and/or combinations thereof, the method comprising:

adapting the narrative generation platform to a specific story type or a specific content vertical by defining a story specification in response to input from a user, wherein the narrative generation platform includes a modular angle, wherein the modular angle corresponds to a characterization of data, wherein the modular angle is re-usable with respect to a plurality of different story types or content verticals, wherein the adapting step comprises:

parameterizing the modular angle, wherein the parameterizing operates to configure the modular angle for the specific story type or the specific content vertical; and including a specification of the parameterized modular angle in the story specification, wherein the story specification organizes a narrative structure for the narrative story, the story specification comprising (1) specifications of a plurality of data models and (2) the specification of the parameterized modular angle, wherein the specifications of the data models and the parameterized modular angle are not expressed as program code directly executable by a processor and are not expressed in a general purpose programming language;

processing the story specification to generate executable code that defines an analytical framework for (1) analyzing the structured data based on the parameterized modular angle and (2) finding a summarization of the data set that fits the data set, wherein the summarization includes an analytical interpretation of the analyzed structured data;

executing the executable code to find the summarization that fits the data set by (1) analyzing the structured data based on the parameterized modular angle and (2) determining whether the characterization corresponding to the parameterized modular angle validly characterizes the structured data; and in response to a determination that the characterization corresponding to the parameterized modular angle validly characterizes the structured data, generating the narrative story in accordance with the narrative structure from the story specification, and wherein the narrative story provides the analytical interpretation of the analyzed structured data by expressing the determined characterization in natural language;

wherein the processing, executing, and generating steps are performed by a processor within the narrative generation platform; and wherein the adapting step is performed without requiring the user to directly author or edit program code.

2. The method of claim 1 wherein the modular angle is associated with a plurality of applicability condition parameters for testing to determine whether the characterization validly characterizes data, wherein the parameterizing step links the applicability condition parameters to the specific story type or content vertical and one or more elements or derived features of the structured data.

3. The method of claim 2 wherein the executing step comprises testing the linked applicability condition parameters against the structured data or data derived therefrom to determine whether the characterization validly characterizes the structured data.

4. The method of claim 3 wherein the story specification further comprises a specification of a plurality of derived features that are not expressed as program code directly executable by a processor and are not expressed in a general purpose programming language; and
wherein the analytical framework is configured to compute the derived features; and
wherein at least one of the applicability condition parameters is linked to at least one of the derived features.

5. The method of claim 1 wherein the story specification further comprises a plurality of content blocks, wherein each content block defines how a corresponding section of the narrative story is to be generated, wherein each content block includes a specification of a modular angle with a corresponding characterization for consideration with respect to the corresponding section.

6. The method of claim 1 wherein the parameterizing step comprises parameterizing a plurality of modular angles that are re-usable with respect to a plurality of different story types or content verticals, wherein each modular angle corresponds to a different characterization of data, wherein the parameterizing operates to configure the modular angles for the specific story type or the specific content vertical, and wherein the story specification comprises a plurality of specifications of the parameterized modular angles;
wherein the executing step comprises executing the executable code with respect to the structured data to determine whether any of the characterizations corresponding to the parameterized modular angles validly characterize the structured data; and
wherein the generating step comprises, in response to a determination that a plurality of the characterizations corresponding to the parameterized modular angles validly characterize the structured data, generating the narrative story in accordance with the narrative structure from the story specification, and wherein the narrative story expresses, in natural language, a plurality of the characterizations determined to validly characterize the structured data.

7. The method of claim 6 further comprising:
determining an importance value applicable to each of the parameterized modular angles whose corresponding characterization was determined to validly characterize the structured data; and
selecting which of the characterizations determined to validly characterize the structured data are to be expressed in the narrative story based on the determined importance values applicable to the parameterized modular angles corresponding thereto.

8. The method of claim 1 further comprising:
providing a user-interactive tool for authoring and/or editing the story specification in response to input from the user without the necessity of the user authoring, editing, or reviewing computer executable code in a general purpose programming language; and
wherein the parameterizing and including steps are performed in response to user inputs received through the provided user-interactive tool.

9. The method of claim 1 further comprising:
performing the parameterizing and including steps for a plurality of different story specifications to build a library of story specifications for a plurality of different specific story types or specific content verticals; and
wherein the method further comprises (1) selecting a story specification from the library in response to user input and (2) performing the processing, executing, and generating steps with respect to the selected story specification.

10. A computer program product for automatically generating a narrative story about a data set using a narrative generation platform that is horizontally scalable to a plurality of different story types or content verticals, the data set comprising structured data in a plurality of fields and/or categories that describe one or more events, situations, entities, and/or combinations thereof, the computer program product comprising:
a plurality of processor-executable instructions that are resident on a non-transitory computer-readable storage medium, wherein the instructions are configured for execution by a processor within the narrative generation platform to cause the processor to:
adapt the narrative generation platform to a specific story type or a specific content vertical by defining a story specification in response to input from a user and without requiring the user to directly author or edit program code, wherein the narrative generation platform includes a modular angle, wherein the modular angle corresponds to a characterization of data, wherein the modular angle is re-usable with respect to a plurality of different story types or content verticals, wherein the adapting step comprises:
parameterize the modular angle, wherein the parameterization operates to configure the modular angle for the specific story type or the specific content vertical; and
include a specification of the parameterized modular angle in the story specification, wherein the story specification organizes a narrative structure for the narrative story, the story specification comprising (1) specifications of a plurality of data models and (2) the specification of the parameterized modular angle, wherein the specifications of the data models and the parameterized modular angle are not expressed as program code directly executable by a processor and are not expressed in a general purpose programming language;
process the story specification to generate executable code that defines an analytical framework for (1) analyzing the structured data based on the parameterized modular angle and (2) finding a summarization of the data set that fits the data set, wherein the summarization includes an analytical interpretation of the analyzed structured data;
execute the executable code to find the summarization that fits the data set by (1) analyzing the structured data based on the parameterized modular angle and (2) determining whether the characterization corresponding to the parameterized modular angle validly characterizes the structured data; and
in response to a determination that the characterization corresponding to the parameterized modular angle validly characterizes the structured data, generate the narrative story in accordance with the narrative structure from the story specification, and wherein the narrative story provides the analytical interpretation of the analyzed structured data by expressing the determined characterization in natural language.

11. The computer program product of claim 10 wherein the modular angle is associated with a plurality of applicability condition parameters for testing to determine whether the characterization validly characterizes data, wherein the instructions are further configured to, as part of the parameterization of the modular angle, link the applicability condition parameters to the specific story type or content vertical and one or more elements or derived features of the structured data.

12. The computer program product of claim 11 wherein the instructions are further configured to, as part of the execution of the executable code, test the linked applicability condition parameters against the structured data or data derived therefrom to determine whether the characterization validly characterizes the structured data.

13. The computer program product of claim 12 wherein the story specification further comprises a specification of a plurality of derived features that are not expressed as program code directly executable by a processor and are not expressed in a general purpose programming language; and
wherein the analytical framework is configured to compute the derived features; and
wherein at least one of the applicability condition parameters is linked to at least one of the derived features.

14. The computer program product of claim 10 wherein the story specification further comprises a plurality of content blocks, wherein each content block defines how a corresponding section of the narrative story is to be generated, wherein each content block includes a specification of a modular angle with a corresponding characterization for consideration with respect to the corresponding section.

15. The computer program product of claim 10 wherein the instructions are further configured to parameterize a plurality of modular angles that are re-usable with respect to a plurality of different story types or content verticals, wherein each modular angle corresponds to a different characterization of data, wherein the parameterizing operates to configure the modular angles for the specific story type or the specific content vertical, and wherein the story specification comprises a plurality of specifications of the parameterized modular angles;
wherein the instructions are further configured to, as part of the execution of the executable code, determine whether any of the characterizations corresponding to the parameterized modular angles validly characterize the structured data; and
wherein the instructions are further configured to, as part of the narrative story generation and in response to a determination that a plurality of the characterizations corresponding to the parameterized modular angles validly characterize the structured data, generate the narrative story in accordance with the narrative structure from the story specification, and wherein the narrative story expresses, in natural language, a plurality of the characterizations determined to validly characterize the structured data.

16. The computer program product of claim 15 wherein the instructions are further configured to:

determine an importance value applicable to each of the parameterized modular angles whose corresponding characterization was determined to validly characterize the structured data; and
select which of the characterizations determined to validly characterize the structured data are to be expressed in the narrative story based on the determined importance values applicable to the parameterized modular angles corresponding thereto.

17. The computer program product of claim 10 wherein the instructions are further configured to:
provide a user-interactive tool for authoring and/or editing the story specification in response to input from the user without the necessity of the user authoring, editing, or reviewing computer executable code in a general purpose programming language; and
perform the parameterization and include operations in response to user inputs received through the provided user-interactive tool.

18. The computer program product of claim 10 wherein the instructions are further configured to:
perform the parameterization and include operations for a plurality of different story specifications to build a library of story specifications for a plurality of different specific story types or specific content verticals;
select a story specification from the library in response to user input; and
perform the process, execution, and generate operations with respect to the selected story specification.

19. A system for automatically generating a narrative story about a data set, wherein the system serves as a narrative generation platform that is horizontally scalable to a plurality of different story types or content verticals, the data set comprising structured data in a plurality of fields and/or categories that describe one or more events, situations, entities, and/or combinations thereof, the system comprising:
a processor; and
a memory;
wherein the processor is configured to:
adapt the narrative generation platform to a specific story type or a specific content vertical by defining a story specification in response to input from a user and without requiring the user to directly author or edit program code, wherein the narrative generation platform includes a modular angle, wherein the modular angle corresponds to a characterization of data, wherein the modular angle is re-usable with respect to a plurality of different story types or content verticals, wherein the adapting step comprises:
parameterize the modular angle, wherein the parameterization operates to configure the modular angle for the specific story type or the specific content vertical; and
include a specification of the parameterized modular angle in the story specification, wherein the story specification organizes a narrative structure for the narrative story, the story specification comprising (1) specifications of a plurality of data models and (2) the specification of the parameterized modular angle, wherein the specifications of the data models and the parameterized modular angle are not expressed as program code directly executable by a processor and are not expressed in a general purpose programming language;

process the story specification to generate executable code that defines an analytical framework for (1) analyzing the structured data based on the parameterized modular angle and (2) finding a summarization of the data set that fits the data set, wherein the summarization includes an analytical interpretation of the analyzed structured data;

execute the executable code to find the summarization that fits the data set by (1) analyzing the structured data based on the parameterized modular angle and (2) determining whether the characterization corresponding to the parameterized modular angle validly characterizes the structured data; and in response to a determination that the characterization corresponding to the parameterized modular angle validly characterizes the structured data, generate the narrative story in accordance with the narrative structure from the story specification, and wherein the narrative story provides the analytical interpretation of the analyzed structured data by expressing the determined characterization in natural language.

20. The method of claim 1 wherein the parameterizing step includes linking a parameter of the modular angle to an element of the structured data or data derived therefrom, and wherein the analytical framework comprises computational elements for testing the linked structured data element or data derived therefrom to determine whether the characterization corresponding to the parameterized modular angle validly characterizes the structured data.

21. The computer program product of claim 10 wherein the parameterization operates to link a parameter of the modular angle to an element of the structured data or data derived therefrom, and wherein the analytical framework comprises computational elements for testing the linked structured data element or data derived therefrom to determine whether the characterization corresponding to the parameterized modular angle validly characterizes the structured data.

22. The system of claim 19 wherein the parameterization operates to link a parameter of the modular angle to an element of the structured data or data derived therefrom, and wherein the analytical framework comprises computational elements for testing the linked structured data element or data derived therefrom to determine whether the characterization corresponding to the parameterized modular angle validly characterizes the structured data.

23. The method of claim 1 wherein the adapting step further comprises specifying an entity model as one of the data models for inclusion in the story specification in response to user input, wherein the entity model models an entity for the specific story type or the specific content vertical, wherein the entity model organizes and structures data within the data set with respect to the entity, and wherein the determined characterization expressed by the narrative story comprises a characterization about the entity.

24. The method of claim 23 wherein the narrative story is a first narrative story that corresponds to a first story type or a first content vertical, the method further comprising:

further adapting the narrative generation platform to a second story type or a second content vertical only by specifying a different story specification and without modifying the narrative generation platform itself; and performing the processing, executing, and generating steps using the different story specification to generate a second narrative story that corresponds to the second story type or the second content vertical.

25. The method of claim 24 wherein the further adapting step comprises adapting the narrative generation platform to the second story type only by specifying the different story specification and without modifying the narrative generation platform itself, wherein the step of specifying the different story specification includes differently parameterizing the modular angle to re-use the modular angle for the second story type.

26. The method of claim 24 wherein the data set comprises first data applicable to the first content vertical and second data applicable to the second content vertical;

wherein the further adapting step comprises adapting the narrative generation platform to the second content vertical only by specifying the different story specification and without modifying the narrative generation platform itself, wherein the step of specifying the different story specification includes (1) specifying a different entity model for inclusion in the different story specification and (2) differently parameterizing the modular angle to re-use the modular angle in the different story specification for the second content vertical, wherein the different entity model models an entity for the second content vertical, and wherein the different entity model organizes and structures data within the second data with respect to the entity of the different entity model.

27. The system of claim 19 wherein the processor is further configured to adapt the narrative generation platform to the specific story type or the specific content vertical by specifying an entity model as one of the data models for inclusion in the story specification in response to user input, wherein the entity model models an entity for the specific story type or the specific content vertical, wherein the entity model organizes and structures data within the data set with respect to the entity, and wherein the determined characterization expressed by the narrative story comprises a characterization about the entity.

28. The system of claim 27 wherein the narrative story is a first narrative story that corresponds to a first story type or a first content vertical, and wherein the processor is further configured to:

further adapt the narrative generation platform to a second story type or a second content vertical only by specifying a different story specification and without modifying the narrative generation platform itself; and perform the process, execute, and generation operations using the different story specification to generate a second narrative story that corresponds to the second story type or the second content vertical.

29. The system of claim 28 wherein the processor is further configured to further adapt the narrative generation platform to the second story type only by specifying the different story specification and without modifying the narrative generation platform itself, wherein the specification of the different story specification includes a different parameterization of the modular angle to re-use the modular angle for the second story type.

30. The system of claim 28 wherein the data set comprises first data applicable to the first content vertical and second data applicable to the second content vertical;

wherein the processor is further configured to further adapt the narrative generation platform to the second content vertical only by specifying the different story specification and without modifying the narrative generation platform itself, wherein the specification of the different story specification includes (1) a specification a different entity model for inclusion in the different story specification and (2) a different parameterization of the modular angle to re-use the modular angle in the different story specification for the second content vertical, wherein the different entity model models an entity for the second content vertical, and wherein the different entity model organizes and structures data within the second data with respect to the entity of the different entity model.

* * * * *